(12) United States Patent
Nagata

(10) Patent No.: US 6,906,867 B2
(45) Date of Patent: Jun. 14, 2005

(54) ZOOM OPTICAL SYSTEM AND IMAGING APPARATUS USING THE SAME

(75) Inventor: Tetsuo Nagata, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 10/457,434

(22) Filed: Jun. 10, 2003

(65) Prior Publication Data

US 2004/0252382 A1 Dec. 16, 2004

Related U.S. Application Data

(63) Continuation-in-part of application No. 10/411,154, filed on Apr. 11, 2003, now abandoned.

(51) Int. Cl.$^7$ .............................................. G02B 15/14
(52) U.S. Cl. ....................... 359/676; 359/686; 359/689; 359/691; 359/708; 359/726; 359/627
(58) Field of Search ................................ 359/676–692, 359/708, 726, 627

(56) References Cited

U.S. PATENT DOCUMENTS

2003/0147146 A1 * 8/2003 Mikami ...................... 359/694

FOREIGN PATENT DOCUMENTS

| JP | 08-248318 | 9/1996 |
|----|-----------|--------|
| JP | 11-220646 | 8/1999 |

* cited by examiner

*Primary Examiner*—Evelyn A. Lester
(74) *Attorney, Agent, or Firm*—Kenyon & Kenyon

(57) ABSTRACT

A zoom optical system includes at least two optical-element groups and a variable optical-property optical element. The two optical-element groups are movable in a magnification change and have a magnification varying function or a compensating function for compensating for a shift of an image surface caused by the magnification change. The optical element has a focusing function and is disposed on the image side of the optical-element groups. According to this configuration of the zoom optical system, it is possible to attain a zoom optical system and an imaging apparatus using the zoom optical system that have as small a number of movable lenses as possible, are very small in size, and work with an extremely low power consumption and low operation noise.

12 Claims, 20 Drawing Sheets

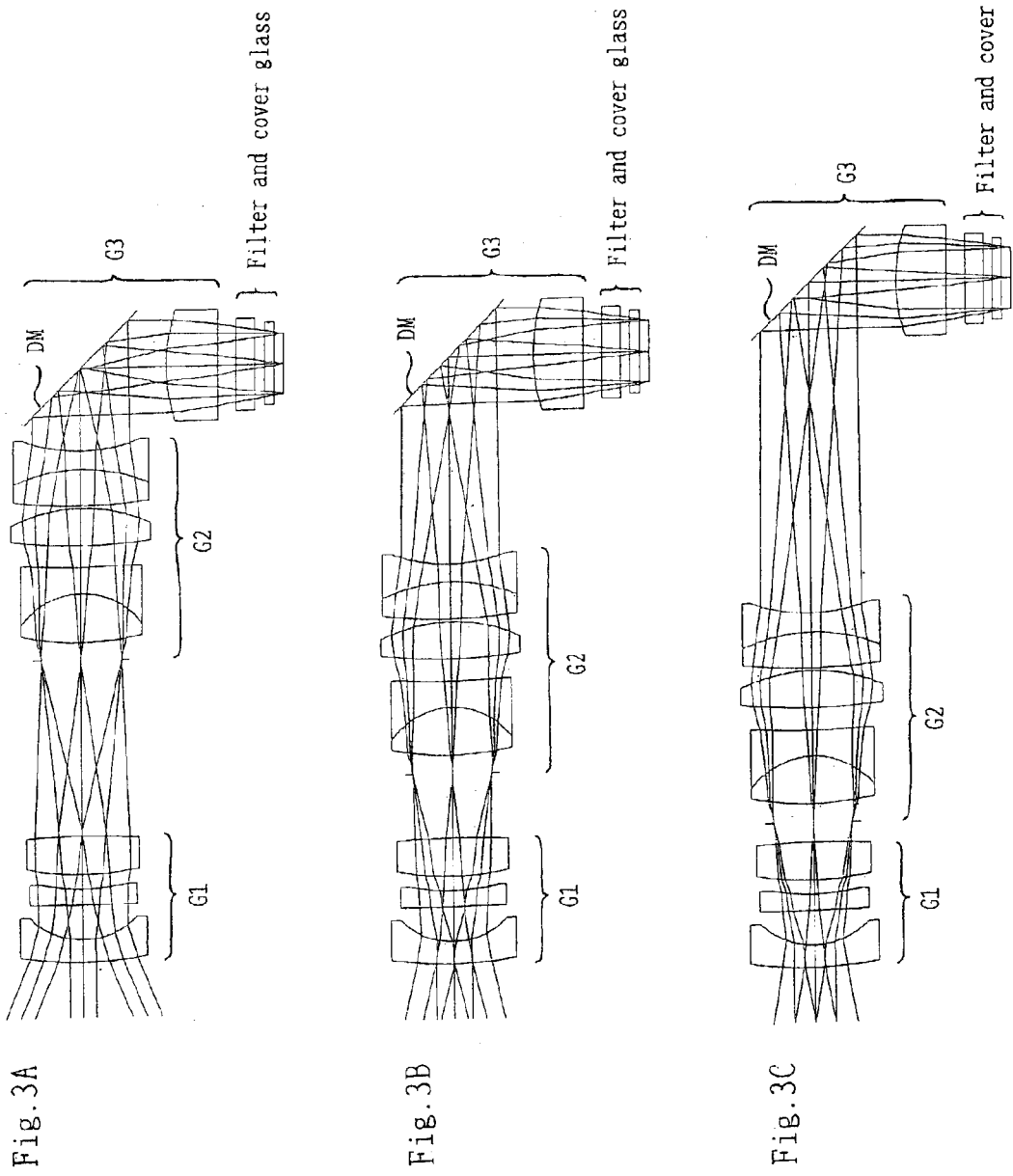

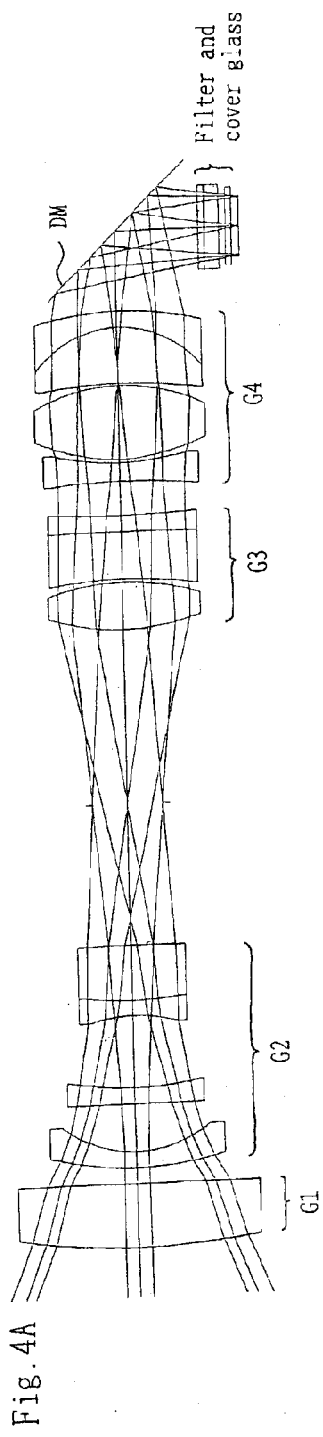
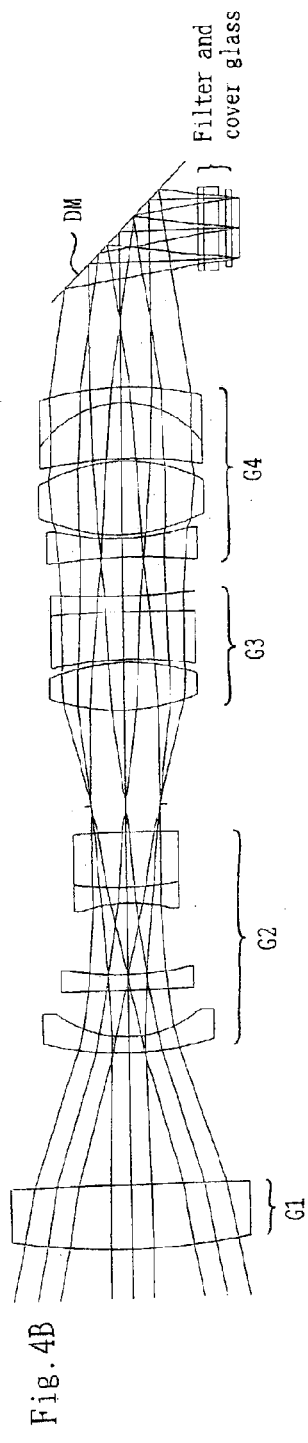
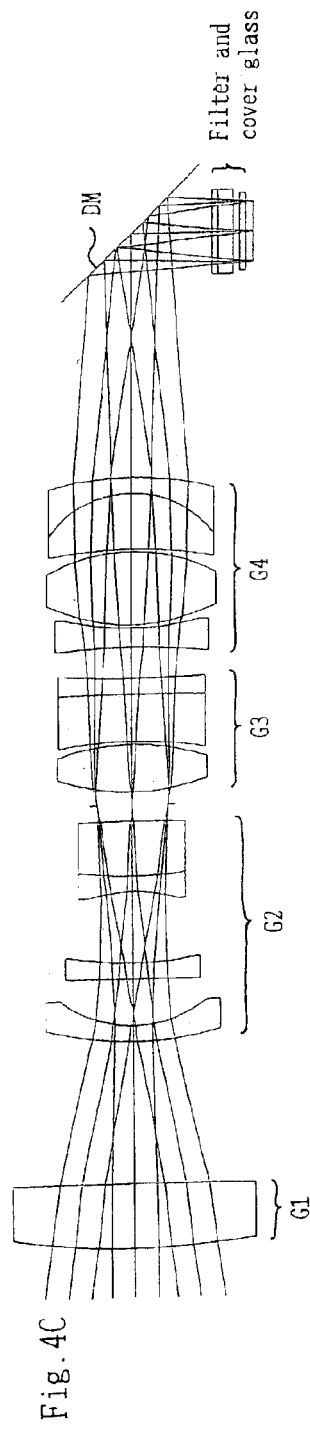
Fig. 4A
Fig. 4B
Fig. 4C

ZOOM OPTICAL SYSTEM AND IMAGING APPARATUS USING THE SAME

CROSS REFERENCES TO RELATED APPLICATIONS

This is a continuation-in-part of application Ser. No. 10/411,154, filed Apr. 11, 2003, which is abandoned.

BACKGROUND OF THE INVENTION

1. Field of the Invention

The present invention relates to a zoom optical system and an imaging apparatus using the zoom optical system.

2. Description of the Related Art

Requirement for compact and thin design of electronic imaging apparatuses has been more and more urgent in recent years. To meet the requirement, it is very important to shorten the total length of optical systems used in imaging apparatuses, such as a photographing optical system, a finder optical system, etc.

Regarding such an optical system, there is a limit to shorten the total length by reducing the number of constituent elements. Therefore, compact and thin design of the optical system in its entirety is aimed at by folding the optical system using mirrors. Furthermore, in folding the optical system, a space for a portion of folding is required. In addition, having a variator group that has a magnification varying function, a compensator group that compensates for a shift of an image surface caused by the magnification change and for aberrations, a focusing group that performs focusing on an object, etc, a zoom optical system is configured to perform magnification change and focusing by shifting, of these len's groups, predetermined lens groups along the optical axis, and thus a space for the movement of the lens groups is needed.

As an optical system thus configured, for example, each of Japanese Patent Application Preliminary Publication (KOKAI) No. Hei 8-248318 and Japanese Patent Application Preliminary Publication (KOKAI) No. Hei 11-220646 discloses an imaging apparatus using a zoom optical system that is given a compact size with the path of rays being folded back.

In such a zoom optical system, in magnification change or focusing, a motor is driven to move lenses.

SUMMARY OF THE INVENTION

A zoom optical system according to the present invention includes at least two optical-element groups and a variable optical-property optical element. The two optical-element groups are movable in a magnification change and have a magnification varying function or a compensating function for compensating for a shift of an image surface caused by the magnification change. The variable optical-property optical element has a focusing function and is disposed on the image side of the optical-element groups having the magnification varying function.

Also, in the zoom optical system according to the present invention, the optical-element groups includes an optical-element group that is disposed on the most object side, and the variable optical-property optical element is arranged in the optical-element group that is disposed on the most object side.

Also, according to the present invention, the variable optical-property optical element is provided with a rotationally asymmetric curved surface having a function for compensating for decentered aberrations.

Also, an imaging apparatus according to the present invention is provided with the zoom optical system set forth above.

These and other features and advantages of the present invention will become apparent from the following detailed description when taken in conjunction with the accompanying drawings.

BRIEF DESCRIPTION OF THE DRAWINGS

FIG. 3A is a sectional view that shows a lens configuration of a zoom optical system according to the third embodiment of the present invention at the wide-angle end.

FIG. 3B is a sectional view that shows a lens configuration of the zoom optical system according to the third embodiment of the present invention at the intermediate position.

FIG. 3C is a sectional view that shows a lens configuration of the zoom optical system according to the third embodiment of the present invention at the telephoto end.

FIG. 4A is a sectional view that shows a lens configuration of a zoom optical system according to the fourth embodiment of the present invention at the wide-angle end.

FIG. 4B is a sectional view that shows a lens configuration of the zoom optical system according to the fourth embodiment of the present invention at the intermediate position.

FIG. 4C is a sectional view that shows a lens configuration of the zoom optical system according to the fourth embodiment of the present invention at the telephoto end.

DETAILED DESCRIPTION OF THE PREFERRED EMBODIMENTS

Figure 1A:
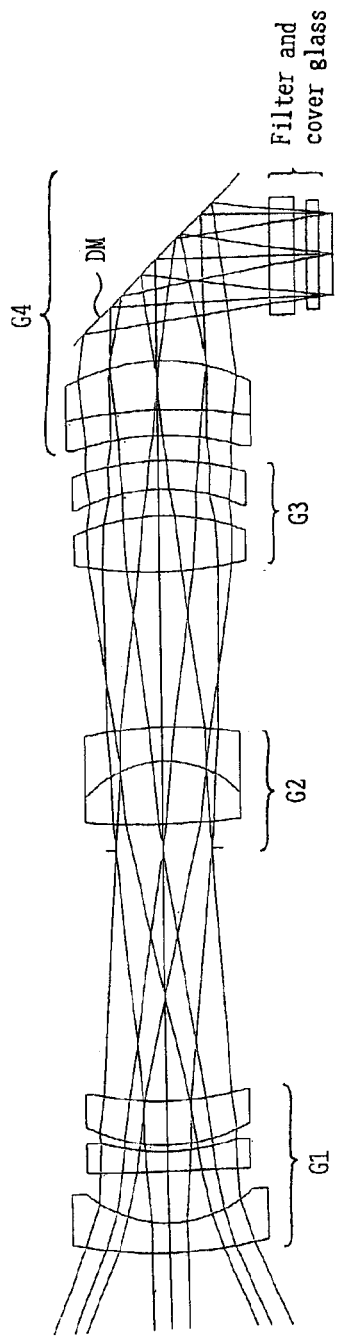
FIG. 1A is a sectional view that shows a lens configuration of a zoom optical system according to the first embodiment of the present invention at the wide-angle end.
Figure 1B:
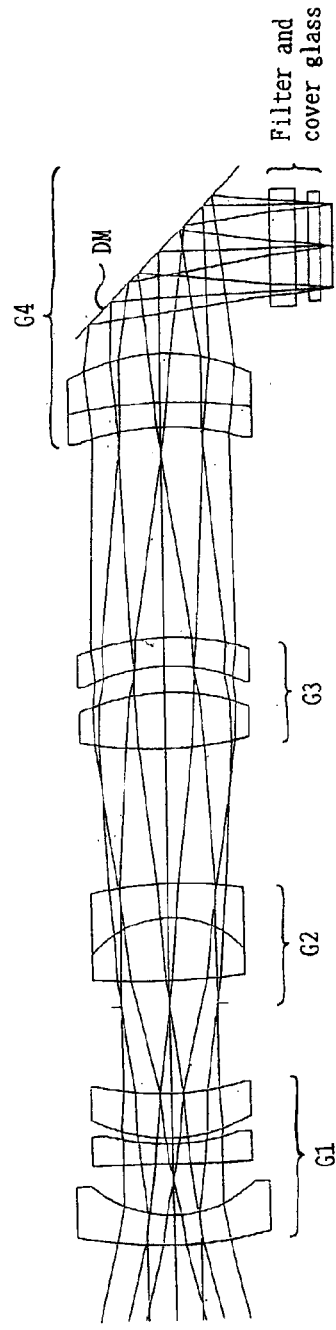
FIG. 1B is a sectional view that shows a lens configuration of the zoom optical system according to the first embodiment of the present invention at the intermediate position.
Figure 1C:
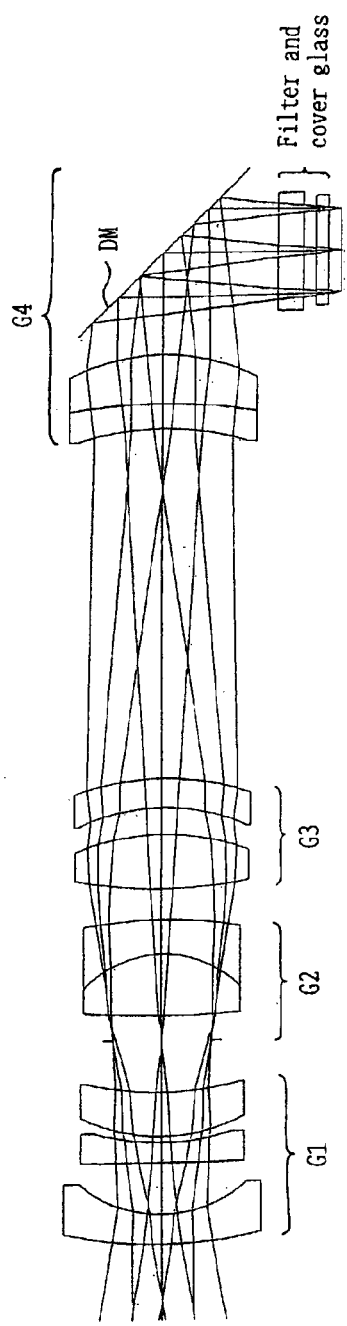
FIG. 1C is a sectional view that shows a lens configuration of the zoom optical system according to the first embodiment of the present invention at the telephoto end.

Preceding the description of the embodiments, the contents of the invention set forth in this specification is summarized below.

(1) A zoom optical system according to the present invention has at least two lens groups that have a magnification varying function or a compensating function for compensating for a shift of an image surface caused by the magnification change and that are movable in the magnification change, and a deformable mirror having a focusing function, wherein the deformable mirror is disposed on the image side of the lens groups having the magnification varying function.

If the focusing function is given to the deformable mirror, it is not necessary to provide a lens moving system including a motor, a driving circuit and so on required for focusing, and thus compact and low-cost design of the zoom optical system can be achieved. In addition, since its reflecting surface is instantly deformable, it is possible to realize an imaging apparatus that performs focusing at a very high speed with a low operation noise and a small power consumption.

Also, if the deformable mirror is disposed on the image side of the at least two lens groups that have a magnification changing function or a compensating function for compensating for a shift of the image surface and that are movable during the magnification change, since height of rays incident on the deformable mirror from the wide-angle end position through the telephoto end position is limited low, the deformable mirror is allowed to be constructed very small. Therefore, cost reduction can be achieved.

(2) Also, in the zoom optical system according to the present invention, the deformable mirror is arranged in the most image-side lens group.

In general, a zoom lens in an imaging system is required to substantially be telecentric on the image side. However, if a configuration is made so that the deformable mirror is arranged in the most image-side lens group, it is possible to minimize, in a magnification change, fluctuation of incident angle of a ray incident on the deformable mirror.

For example, if the deformable mirror is inserted on the object side of a lens group having a magnification varying function, angle of a ray incident on the deformable mirror greatly fluctuates in a magnification change. As a result, it is difficult to suppress fluctuation, caused by the magnification change, of decentered coma generated at the deformable mirror. On the other hand, if the configuration is made so that the deformable mirror is arranged in the most image-side lens group as in the present invention, it is possible to suppress fluctuation of the incident angle to be small and accordingly fluctuation of decentered coma to be very small. Consequently, it is possible to perform focusing while keeping good imaging performance in every condition during the magnification change.

(3) Also, in the zoom optical system according to the present invention, the deformable mirror is provided with a rotationally asymmetric curved surface that has a function for compensating for decentered aberrations.

If such a surface is provided, it is possible to suppress decentered coma generated at the deformable mirror to be very small.

(4) Also, in the zoom optical system according to the present invention, it is preferable that a distance from the exit pupil position as viewed from the optical system that is on the object side of the deformable mirror to the deformable mirror satisfies the following conditions (1-1) and (2-1):

$$0.5 < EX_W/f_W < 50.0 \tag{1-1}$$

$$0.5 < EX_T/f_T < 50.0 \tag{2-1}$$

where $EX_W$ is a physical distance from the exit pupil position of the optical system as viewed from the deformable mirror to the deformable mirror at the wide-angle end, $EX_T$ is a physical distance from the exit pupil position of the optical system as viewed from the deformable mirror to the deformable mirror at the telephoto end, $f_W$ is a focal length of the entire system at the wide-angle end, and $f_T$ is a focal length of the entire system at the telephoto end.

Conditions (1-1) and (1-2) are conditions that limit angles of rays incident on the deformable mirror, for maintaining incident angles of rays, from axial ones to off-axial ones, as constant as possible.

If the lower limit of Condition (1-1) or (2-1) is not reached, the exit pupil position as viewed from the deformable mirror is so close that telecentricity fails, and accordingly, incident angles on the deformable mirror greatly vary from an axial position to an off-axial position. As a result, a large amount of decentered coma is generated, which is not preferable. On the other hand, if the upper limit value of Condition (1-1) or (2-1) is exceeded, while generation of decentered coma can be made small, it is necessary to configure the variable magnification lens system to achieve complete telecentricity, therefor with a large number of lens elements. Such a configuration prevents compact design and thus is not preferable.

(5) Also, in the zoom optical system according to the present invention, it is much preferable that the distance from the exit pupil position as viewed from the optical system that is on the object side of the deformable mirror to the deformable mirror satisfies the following conditions (1-2) and (2-2):

$$1.0 < EX_W/f_W < 40.0 \tag{1-2}$$

$$1.0 < EX_T/f_T < 40.0 \tag{2-2}$$

If Conditions (1-2) and (2-2) are satisfied in place of Conditions (1-1) and (2-1), it is possible to better achieve number reduction of lens elements and size reduction, while suppressing generation of decentered coma to be small.

(6) Also, in the zoom optical system according to the present invention, it is still much preferable that the distance from the exit pupil position as viewed from the optical system that is on the object side of the deformable mirror to the deformable mirror satisfies the following conditions (1-3) and (2-3):

$$2.0 < EX_W/f_W < 30.0 \quad (1\text{-}3)$$

$$2.0 < EX_T/f_T < 30.0 \quad (2\text{-}3)$$

If Conditions (1-3) and (2-3) are satisfied in place of Conditions (1-2) and (2-2), it is possible most effectively to achieve number reduction of lens elements and size reduction, while suppressing generation of decentered coma to be small.

(7) Also, in the zoom optical system according to the present invention, it is preferable that magnification $\xi_W$ of a group of lenses arranged between the deformable mirror and the image surface satisfies the following condition (3-1):

$$0.3 < \xi_W < 0.9 \quad (3\text{-}1)$$

Condition (3-1) is a condition for suppressing the amount of deformation of the deformable mirror to be small. If the lower limit of Condition (3-1) is not reached, while the focal length of the group of lenses arranged between the deformable mirror and the image surface is short, to allow the amount of deformation of the deformable mirror to be small, aberrations generated in the group of lenses arranged between the deformable mirror and the image surface would become large, to necessitate, for the purpose of moderating the aberrations, a configuration including a plurality of lens elements, which is not preferable. In addition, compact design of the entire imaging system cannot be attained. On the other hand, if the upper limit of Condition (3-1) is exceeded, the amount of deformation of the deformable mirror cannot be set small, specifically, a large amount of deformation is necessary at the telephoto end, and thus such a configuration is not preferable.

In the range specified by Condition (3-1), it is possible to set the amount of deformation small while keeping good imaging performance.

(8) Also, in the zoom optical system according to the present invention, it is much preferable that the magnification $\xi_W$ of the group of lenses arranged between the deformable mirror and the image surface satisfies the following condition (3-2):

$$0.4 < \xi_W < 0.8 \quad (3\text{-}2)$$

If Condition (3-2) is satisfied in place of Condition (3-1), it is possible more effectively to set the amount of deformation small while keeping good imaging performance.

(9) Also, in the zoom optical system according to the present invention, it is still much preferable that the magnification $\xi_W$ of the group of lenses arranged between the deformable mirror and the image surface satisfies the following condition (3-3):

$$0.5 < \xi_W < 0.7 \quad (3\text{-}3)$$

If Condition (3-3) is satisfied in place of Condition (3-2), it is possible still more effectively to set the amount of deformation small while keeping good imaging performance.

(10) Also, it is preferable that the zoom optical system according to the present invention satisfies the following condition (4-1):

$$-5.0 < (f_a/f_b) \times f_W < -0.5 \quad (4\text{-}1)$$

where $f_a$ is a focal length, at the wide-angle end, of a group of lenses arranged on the object side of the aperture stop, $f_b$ is a focal length, at the wide-angle end, of a group of lenses arranged on the image side of the aperture stop, and $f_W$ is a focal length, at the wide-angle end, of the entire optical system.

Condition (4-1) limits the power ratio of the front group to the rear group, with the aperture stop being interposed between, of the zoom optical system, as normalized by the focal length of the entire system, and is a condition for securing a space for inserting the deformable mirror.

If the lower limit of Condition (4-1) is not reached, it forms a weak retrofocus system, which has no space for the deformable mirror to be inserted therein and thus is not preferable. On the other hand, if the upper limit of Condition (4-1) is exceeded, while the configuration enhances the degree of retrofocus characteristic of the system and thus is advantageous in view of securing the space, it degrades aberration performance such as coma, chromatic aberration of magnification, and distortion because of the asymmetric power distribution with respect to the aperture stop, and thus is not preferable. In the range specified by Condition (4-1), it is possible to secure a space for the deformable mirror without degrading the aberrations.

(11) Also, it is much preferable that the zoom optical system according to the present invention satisfies the following condition (4-2):

$$-4.0 < (f_a/f_b) \times f_W < -0.8 \quad (4\text{-}2)$$

If Condition (4-2) is satisfied in place of Condition (4-1), it is possible more effectively to secure a space for the deformable mirror without degrading the aberrations.

(12) Also, it is still much preferable that the zoom optical system according to the present invention satisfies the following condition (4-3):

$$-3.0 < (f_a/f_b) \times f_W < -1.0 \quad (4\text{-}3)$$

If Condition (4-3) is satisfied in place of Condition (4-2), it is possible still more effectively to secure a space for the deformable mirror without degrading the aberrations.

(13) Also, it is preferable that the zoom optical system according to the present invention satisfies the following condition (5-1):

$$D < 20.0 \text{ mm} \quad (5\text{-}1)$$

where D is an effective diameter of the deformable mirror.

A deformable mirror having an effective diameter for rays greater than the upper limit of Condition (5-1) involves a large amount of deformation of the surface shape, to cause difficulty in controlling the surface shape, as well as to prevent low-cost production. In addition, even if surface shape control is possible, energy required for deformation is large and thus is not appropriate in view of power saving.

(14) Also, it is much preferable that the zoom optical system according to the present invention satisfies the following condition (5-2):

$$D < 15.0 \text{ mm} \quad (5\text{-}2)$$

Satisfaction of Condition (5-2) in place of Condition (5-1) is more effective in surface shape control, low-cost production, and power saving.

(15) Also, it is still much preferable that the zoom optical system according to the present invention satisfies the following condition (5-3):

$$D < 12.0 \text{ mm} \quad (5\text{-}3)$$

Satisfaction of Condition (5-3) in place of (5-2) is still more effective in surface shape control, low-cost production, and power saving.

(16) Also, an imaging apparatus according to the present invention is configured to use a zoom optical system that includes, in order from the object side, a first group with a negative power, a second group with a positive power, a third group with a positive power, and a fourth group with a positive power, at least one of the second group and the third group having a magnification varying function, wherein the zoom optical system is provided with at least one of the itemized features set forth above.

(17) Also, an imaging apparatus according to the present invention is configured to use a zoom optical system that includes, in order from the object side, a first group with a negative power, a second group with a positive power, and a third group with a positive power, at least the second group having a magnification varying function, wherein the zoom optical system is provided with at least one of the itemized features set forth above.

The zoom optical systems used in the imaging apparatuses thus configured are based on a type of zoom lens system having a first group with a negative refracting power and a compound system including a second and subsequent groups with a positive refracting power, which type is typical as a photographing optical system of a digital camera.

(18) Also, an imaging apparatus according to the present invention is configured to use a zoom optical system that includes, in order from the object side, a first group with a positive power, a second group with a negative power, a third group with a positive power, and a fourth group with a positive power, at least the second group having a magnification varying function, wherein the zoom optical system is provided with at least one of the itemized features above.

(19) Also, in the zoom optical system according to the present invention, it is preferable that an angle $\Phi$ of turning of an optical axis caused by the deformable mirror satisfies the following condition:

$$70° \leq \Phi \leq 110°$$

(20) Also, an imaging apparatus according to the present invention is configured to use any one of the zoom optical systems set forth above.

(21) Also, in a zoom optical system and an imaging apparatus provided with a zoom optical system according to the present invention, it is preferable to use a deformable mirror that is driven by an electrostatic force, an electromagnetic force, a piezoelectric effect or fluid.

(22) Also, in a zoom optical system and an imaging apparatus provided with a zoom optical system according to the present invention, an ordinary mirror maybe used in place of the deformable mirror.

Also, if the deformable mirror used in the zoom optical system according to the present invention is configured to be deformed into such a shape as to compensate for degradation of optical performance caused by fabrication error of other lenses, the number of defective products can be drastically reduced, to suppress fabrication cost.

Also, arranging the image pickup element so that its short side is parallel with the direction of decentration of the deformable mirror can reduce the effective diameter for rays of the deformable mirror, as well as is advantageous in view of compensation for aberrations, and thus is desirable. On the other hand, in view of design convenience of digital camera etc, arrangement may be made so that the long side of the image pickup element is parallel with the direction of decentration of the deformable mirror.

In addition, in the zoom optical system according to the present invention, a configuration in which the deformable mirror has a compensator function with pan-focus operation being performed via other lenses facilitates compact and low-cost design and thus is favorable.

A free-formed surface used in the present invention is defined by the following equation (a) where Z axis appearing therein is the axis of the free-formed surface:

$$Z = cr^2 / \left[1 + \sqrt{\{1 - (1+k)c^2 r^2\}}\right] + \sum_{j=2}^{66} c_j x^m Y^n \quad (a)$$

The first term of Equation (a) expresses the spherical surface component. The second term of Equation (a) expresses the free-formed surface component. In the term of the spherical surface component, c is a curvature at the vertex, k is a conic constant, $r = \sqrt{(X^2 + Y^2)}$, and N is an integer equal to or greater than 2.

The term of the free-formed surface component is expanded as shown in the following equation:

$$\sum_{j=2}^{66} C_j X^m Y^n = C_2 X + C_3 Y +$$
$$C_4 X^2 + C_5 XY + C_6 Y^2 +$$
$$C_7 X^3 + C_8 X^2 Y + C_9 XY^2 + C_{10} Y^3 +$$
$$C_{11} X^4 + C_{12} X^3 Y + C_{13} X^2 Y^2 + C_{14} XY^3 + C_{15} Y^4 +$$
$$C_{16} X^5 + C_{17} X^4 Y + C_{18} X^3 Y^2 + C_{19} X^2 Y^3 + C_{20} XY^4 + C_{21} Y^5 +$$
$$C_{22} X^6 + C_{23} X^5 Y + C_{24} X^4 Y^2 + C_{25} X^3 Y^3 + C_{26} X^2 Y^4 + C_{27} XY^5 + C_{28} Y^6 +$$
$$C_{29} X^7 + C_{30} X^6 Y + C_{31} X^5 Y^2 + C_{32} X^4 Y^3 + C_{33} X^3 Y^4 + C_{34} X^2 Y^5 + C_{35} XY^6 + C_{36} Y^7$$

where $C_j$ (j is integer equal to or greater than 2) is a coefficient.

In general, a free-formed surface as expressed above does not have a plane of symmetry along X-Z plane or along Y-Z plane. However, upon all terms with odd-numbered powers of X being nullified, the free-formed surface can define only one plane of symmetry that is parallel to Y-Z plane.

The free-formed surface, which has a rotationally asymmetric curvature, can be defined in another manner by Zernike polynomial, also. The configuration of the surface is defined by the following equations (b). Z axis appearing in Equations (b) represents the axis of Zernike polynomial. The rotationally asymmetric surface is defined by height in Z axis, in terms of polar coordinate, in reference to X-Y plane, where R is a distance from Z axis in X-Y plane, and A is an azimuth about Z axis expressed by a revolution angle from Z axis:

$X = R \times \cos(A)$ $Y = R \times \sin(A)$ $Z = D_2$ $+D_3 R \cos(A) + D_4 R \sin(A) +$ $D_5 R^2 \cos(2A) + D_6(R^2-1) + D_7 R^2 \sin(2A) +$ $D_8 R^3 \cos(3A) + D_9(3R^3-2R)\cos(A) + D_{10}(3R^3-$ $2R)\sin(A) + D_{11} R^3 \sin(3A) +$ $D_{12} R^4 \cos(4A) + D_{13}(4R^4-3R^2)\cos(2A) + D_{14}(6$ $R^4 - 6R^2 + 1) +$ $D_{15}(4R^4-3R^2)\sin(2A) + D_{16} R^4 \sin(4A) +$ $D_{17} R^5 \cos(5A) + D_{18}(5R^5-4R^3)\cos(3A) + D_{19}(10$ $R^5 - 12R^3 + 3R)\cos(A) +$ $D_{20}(10R^5-12R^3+3R)\sin(A) + D_{21}(5R^5-4R^3)\sin(3$ $A) + D_{22} R^5 \sin(5A) +$ $D_{23} R^6 \cos(6A) + D_{24}(6R^6-5R^4)\cos(4A) + D_{25}(15R$ $6 - 20R^4 + 6R^2)\cos(2A) +$ $D_{26}(20R^6-30R^4+12R^2-1) + D_{27}(15R^6-20R^4+6$ $R^2)\sin(2A) +$ $D_{28}(6R^6-5R^4)\sin(4A) + D_{29} R^6 \sin(6A)$  (b)

It is noted that $D_m$ (m is integer equal to or greater than 2) is a coefficient. In order to design the surface as an optical system that is symmetric in X-axis direction, $D_4$, $D_5$, $D_6$, $D_{10}$, $D_{11}$, $D_{12}$, $D_{13}$, $D_{14}$, $D_{20}$, $D_{21}$, $D_{22}$ . . . should be used.

The above equations for definition are set forth as an example for expressing a rotationally asymmetric curved surface. The same effect can be obtained by application of any other definition, as a matter of course; the configuration of a curvature can be expressed by another definition as long as it is mathematically equivalent.

According to the present invention, upon all terms with odd-numbered powers of X in Equations (a) being nullified, the free-formed surface can define only one plane of symmetry that is parallel to Y-Z plane.

A surface decentration is given by an amount of decentration (expressed by X, Y, and Z for components in X-axis direction, Y-axis direction, and Z-axis direction, respectively) of the vertex position of the surface from the center of the reference surface of the optical system and a tilt angle (expressed by $\alpha$, $\beta$, and $\gamma$ in degrees) of the center axis of the surface (in the case of a free-formed surface, Z axis in Equation (a)). In this case, a positive value of $\alpha$, $\beta$ or $\gamma$ means counterclockwise rotation in reference to the positive direction of the corresponding axis.

Regarding the order of decentration operation, after decentration in X, Y and Z directions is operated, the coordinate system is tilted in the order of $\alpha$, $\beta$, and $\gamma$, to define the definition coordinate system.

Also, in a case where only the tilt of a reflecting surface is to be expressed, the tilt angles of the center axis of the surface are given as the amount of decentration.

Also, an aspherical surface is defined by the following equation:

$z = (y^2/r)/[1+\{1-(1+k)\cdot(y/r)^2\}^{1/2}] + ay^4 + by^6 + cy^8 + dy^{10}$  (c)

where z is taken along the optical axis, y is taken along a direction perpendicular to the optical axis, k is a conical coefficient, and a, b, c, and d are aspherical coefficients.

The explanation above regarding the numerical data is commonly applicable to the later presented numerical data of each embodiment according to the present invention.

Here, in reference to the drawings, description is made of the embodiments of the zoom optical system according to the present invention.

A zoom optical system and an optical apparatus according to the present invention use a variable optical-property optical element (for example, deformable mirror, liquid crystal lens, etc). In each of the zoom optical systems according to the first through fourth embodiments, a deformable mirror is used as a variable optical-property optical element. There, the deformable mirror is given a focusing function. This configuration allows power consumption to be saved in comparison with a configuration in which focusing is performed via a mechanical structure. In addition, since the mechanical structure for focusing is dispensable, the lens frame structure can be simplified.

Furthermore, the deformable mirror is arranged in the most image-side group. Accordingly, the mirror can be made small, to realize a low cost design. In general, a zoom lens in an imaging system is required to substantially telecentric on the image side. Under this condition, each of the zoom optical systems according to the first to fourth embodiments is configured to arrange the deformable mirror in the most image-side group. Consequently, variation of incident angle of rays incident on the deformable mirror can be made small in a magnification change. As a result, decentered aberrations generated at the deformable mirror can be made small. In this way, it is possible to perform focusing while maintaining good image performance.

Figure 2A:
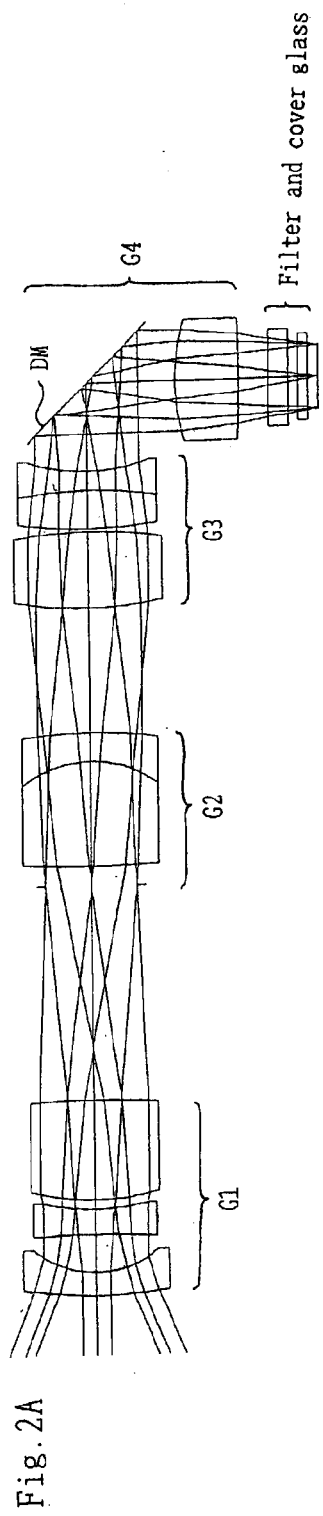
FIG. 2A is a sectional view that shows a lens configuration of a zoom optical system according to the second embodiment of the present invention at the wide-angle end.
Figure 2B:
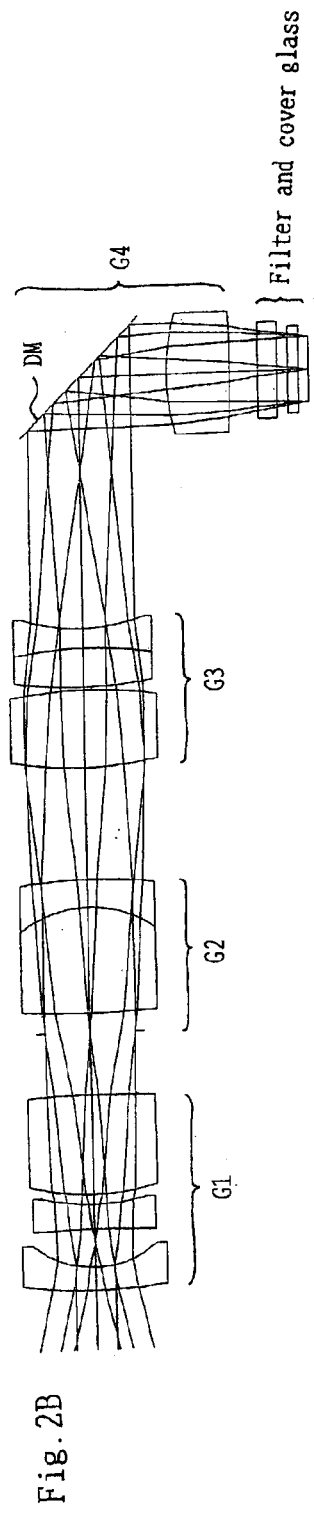
FIG. 2B is a sectional view that shows a lens configuration of the zoom optical system according to the second embodiment of the present invention at the intermediate position.
Figure 2C:
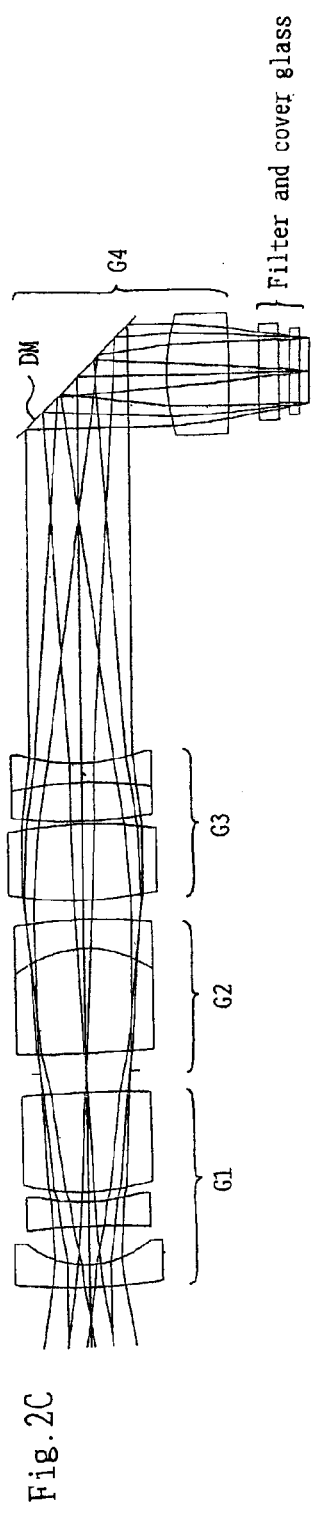
FIG. 2C is a sectional view that shows a lens configuration of the zoom optical system according to the second embodiment of the present invention at the telephoto end.

Lens sectional views of the zoom optical systems according to the first through fourth embodiments are shown in FIGS. 1 through FIGS. 4, respectively. FIG. 1A is a sectional view that shows a lens configuration at the wide-angle end, FIG. 1B is a sectional view that shows a lens configuration at the intermediate position, and FIG. 1C is a sectional view that shows a lens configuration at the telephoto end. FIGS. 2 through FIGS. 4 also show lens configurations at the wide-angle end, at the intermediate position, and at the telephoto end, in the manner similar to FIGS. 1.

Figure 6:
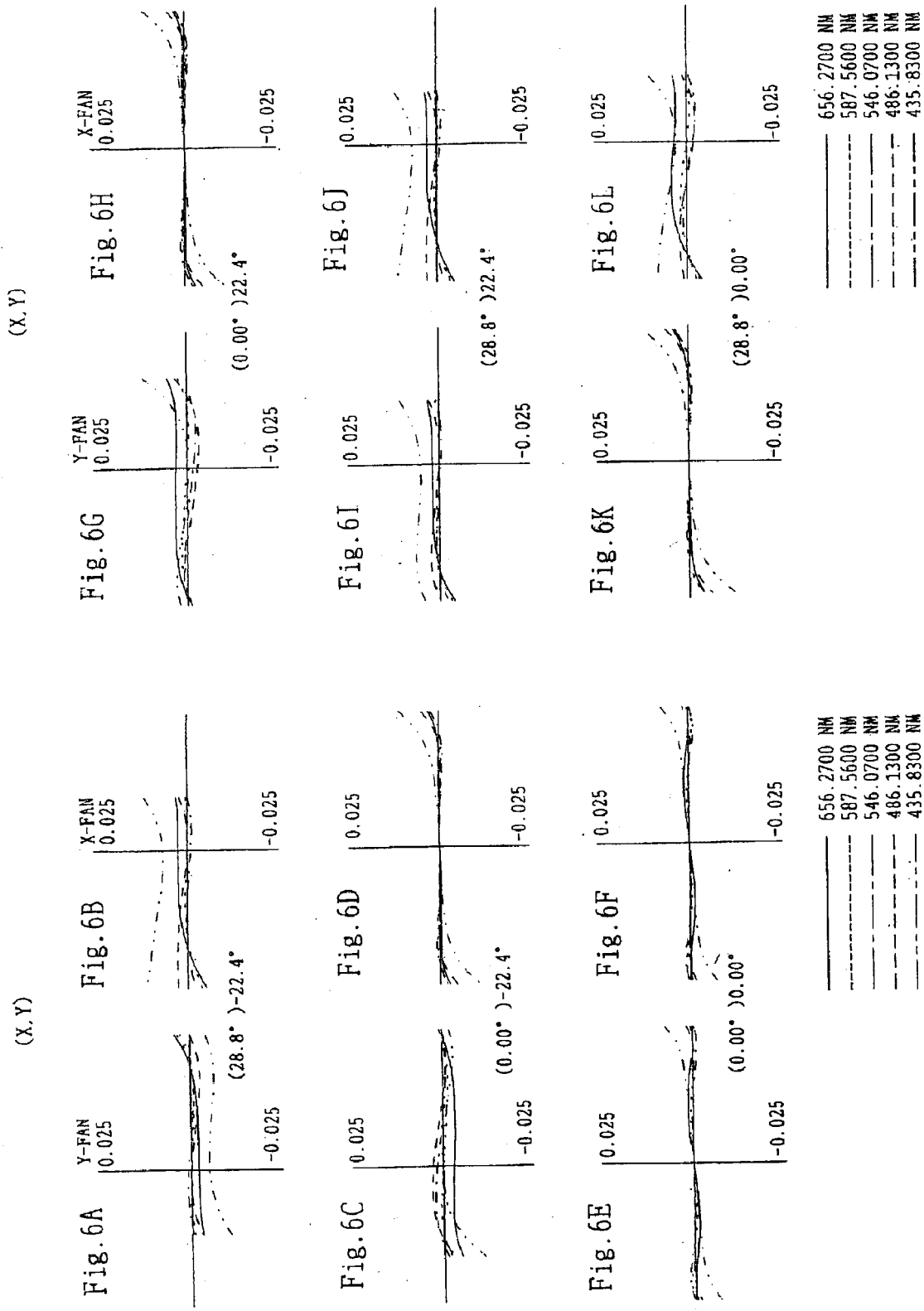
FIG. 6A is an aberration diagram that shows Y-direction lateral aberration of a chief ray that traverses a point where X-direction field angle is extreme in positive direction, or 28.8° and Y-direction field angle is extreme in negative direction, or −22.4° under the condition where the object distance is infinite at the wide-angle end in the zoom optical system according to the first embodiment of the present invention.
FIG. 6B is an aberration diagram that shows X-direction lateral aberration of the chief ray that traverses the point where X-direction field angle is extreme in positive direction, or 28.8° and Y-direction field angle is extreme in negative direction, or −22.4° under the condition where the object distance is infinite at the wide-angle end in the zoom optical system according to the first embodiment of the present invention.
FIG. 6C is an aberration diagram that shows Y-direction lateral aberration of a chief ray that traverses a point where X-direction field angle is zero and Y-direction field angle is extreme in negative direction, or −22.4° under the condition where the object distance is infinite at the wide-angle end in the zoom optical system according to the first embodiment of the present invention.
FIG. 6D is an aberration diagram that shows X-direction lateral aberration of the chief ray that traverses the point where X-direction field angle is zero and Y-direction field angle is extreme in negative direction, or −22.4° under the condition where the object distance is infinite at the wide-angle end in the zoom optical system according to the first embodiment of the present invention.
FIG. 6E is an aberration diagram that shows Y-direction lateral aberration of a chief ray that traverses a point where X-direction field angle is zero and Y-direction field angle is zero under the condition where the object distance is infinite at the wide-angle end in the zoom optical system according to the first embodiment of the present invention.
FIG. 6F is an aberration diagram that shows X-direction lateral aberration of the chief ray that traverses the point where X-direction field angle is zero and Y-direction field angle is zero under the condition where the object distance is infinite at the wide-angle end in the zoom optical system according to the first embodiment of the present invention.
FIG. 6G is an aberration diagram that shows Y-direction lateral aberration of a chief ray that traverses a point where X-direction field angle is zero and Y-direction field angle is extreme in positive direction, or 22.4° under the condition where the object distance is infinite at the wide-angle end in the zoom optical system according to the first embodiment of the present invention.
FIG. 6H is an aberration diagram that shows X-direction lateral aberration of the chief ray that traverses the point where X-direction field angle is zero and Y-direction field angle is extreme in positive direction, or 22.4° under the condition where the object distance is infinite at the wide-angle end in the zoom optical system according to the first embodiment of the present invention.
FIG. 6I is an aberration diagram that shows Y-direction lateral aberration of a chief ray that traverses a point where X-direction field angle is extreme in positive direction, or 28.8° and Y-direction field angle is extreme in positive direction, or 22.4° under the condition where the object distance is infinite at the wide-angle end in the zoom optical system according to the first embodiment of the present invention.
FIG. 6J is an aberration diagram that shows X-direction lateral aberration of the chief ray that traverses the point where X-direction field angle is extreme in positive direction, or 28.8° and Y-direction field angle is extreme in positive direction, or 22.4° under the condition where the object distance is infinite at the wide-angle end in the zoom optical system according to the first embodiment of the present invention.
FIG. 6K is an aberration diagram that shows Y-direction lateral aberration of a chief ray that traverses a point where X-direction field angle is extreme in positive direction, or 28.8° and Y-direction field angle is zero under the condition where the object distance is infinite at the wide-angle end in the zoom optical system according to the first embodiment of the present invention.
FIG. 6L is an aberration diagram that shows X-direction lateral aberration of the chief ray that traverses the point where X-direction field angle is extreme in positive direction, or 28.8° and Y-direction field angle is zero under the condition where the object distance is infinite at the wide-angle end in the zoom optical system according to the first embodiment of the present invention.
Figure 7:
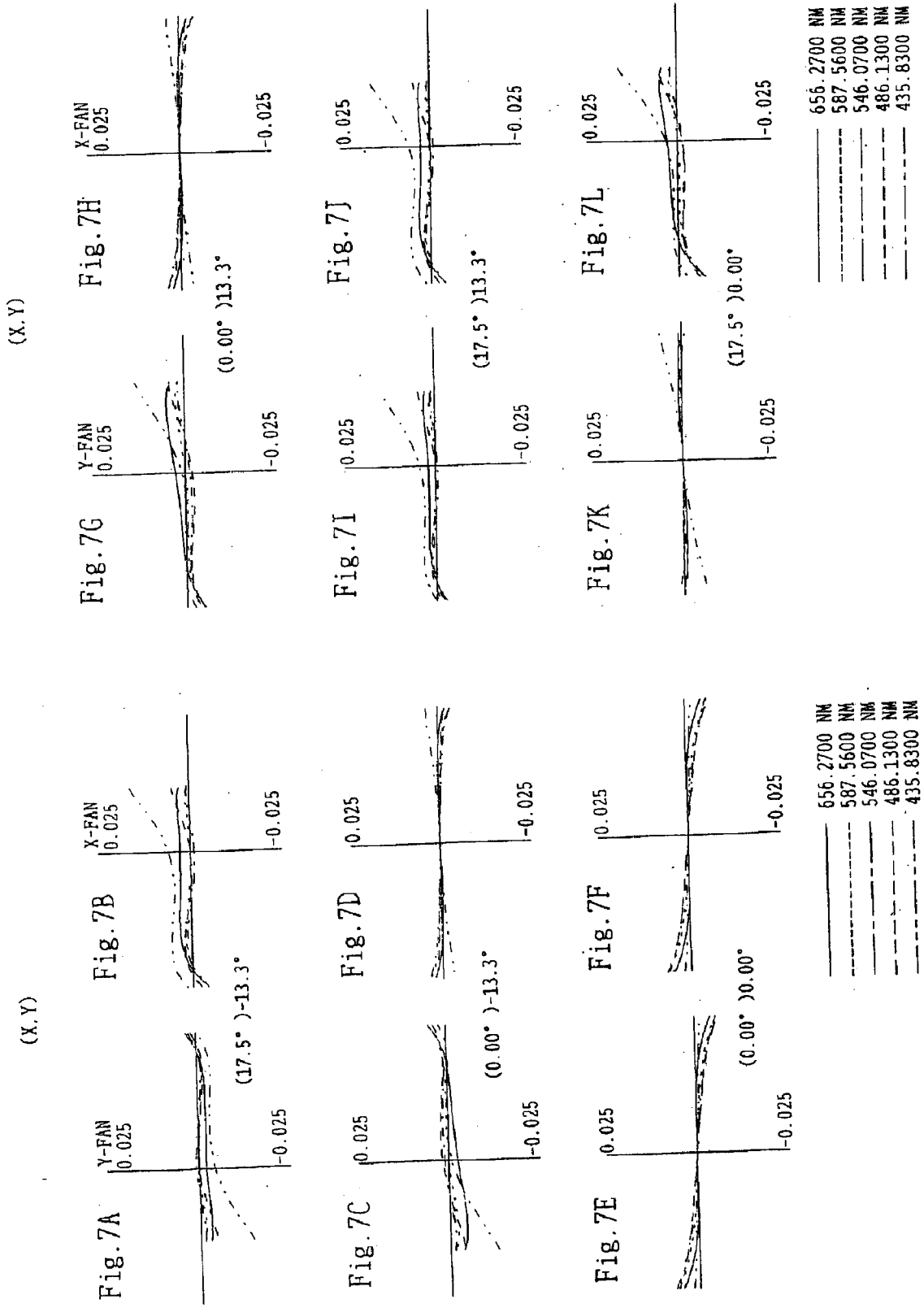
FIG. 7A is an aberration diagram that shows Y-direction lateral aberration of a chief ray that traverses a point where X-direction field angle is extreme in positive direction, or 17.5° and Y-direction field angle is extreme in negative direction, or −13.3° under the condition where the object distance is infinite at the intermediate position in the zoom optical system according to the first embodiment of the present invention.
FIG. 7B is an aberration diagram that shows X-direction lateral aberration of the chief ray that traverses the point where X-direction field angle is extreme in positive direction, or 17.5° and Y-direction field angle is extreme in negative direction, or −13.3° under the condition where the object distance is infinite at the intermediate position in the zoom optical system according to the first embodiment of the present invention.
FIG. 7C is an aberration diagram that shows Y-direction lateral aberration of a chief ray that traverses a point where X-direction field angle is zero and Y-direction field angle is extreme in negative direction, or −13.3° under the condition where the object distance is infinite at the intermediate position in the zoom optical system according to the first embodiment of the present invention.
FIG. 7D is an aberration diagram that shows X-direction lateral aberration of the chief ray that traverses the point where X-direction field angle is zero and Y-direction field angle is extreme in negative direction, or −13.3° under the condition where the object distance is infinite at the intermediate position in the zoom optical system according to the first embodiment of the present invention.
FIG. 7E is an aberration diagram that shows Y-direction lateral aberration of a chief ray that traverses a point where X-direction field angle is zero and Y-direction field angle is zero under the condition where the object distance is infinite at the intermediate position in the zoom optical system according to the first embodiment of the present invention.
FIG. 7F is an aberration diagram that shows X-direction lateral aberration of the chief ray that traverses the point where X-direction field angle is zero and Y-direction field angle is zero under the condition where the object distance is infinite at the intermediate position in the zoom optical system according to the first embodiment of the present invention.
FIG. 7G is an aberration diagram that shows Y-direction lateral aberration of a chief ray that traverses a point where X-direction field angle is zero and Y-direction field angle is extreme in positive direction, or 13.3° under the condition where the object distance is infinite at the intermediate position in the zoom optical system according to the first embodiment of the present invention.
FIG. 7H is an aberration diagram that shows X-direction lateral aberration of the chief ray that traverses the point where X-direction field angle is zero and Y-direction field angle is extreme in positive direction, or 13.3° under the condition where the object distance is infinite at the intermediate position in the zoom optical system according to the first embodiment of the present invention.
FIG. 7I is an aberration diagram that shows Y-direction lateral aberration of a chief ray that traverses a point where X-direction field angle is extreme in positive direction, or 17.5° and Y-direction field angle is extreme in positive direction, or 13.3° under the condition where the object distance is infinite at the intermediate position in the zoom optical system according to the first embodiment of the present invention.
FIG. 7J is an aberration diagram that shows X-direction lateral aberration of the chief ray that traverses the point where X-direction field angle is extreme in positive direction, or 17.5° and Y-direction field angle is extreme in positive direction, or 13.3° under the condition where the object distance is infinite at the intermediate position in the zoom optical system according to the first embodiment of the present invention.
FIG. 7K is an aberration diagram that shows Y-direction lateral aberration of a chief ray that traverses a point where X-direction field angle is extreme in positive direction, or 17.5° and Y-direction field angle is zero under the condition where the object distance is infinite at the intermediate position in the zoom optical system according to the first embodiment of the present invention.
FIG. 7L is an aberration diagram that shows X-direction lateral aberration of the chief ray that traverses the point where X-direction field angle is extreme in positive direction, or 17.5° and Y-direction field angle is zero under the condition where the object distance is infinite at the intermediate position in the zoom optical system according to the first embodiment of the present invention.
Figure 8:
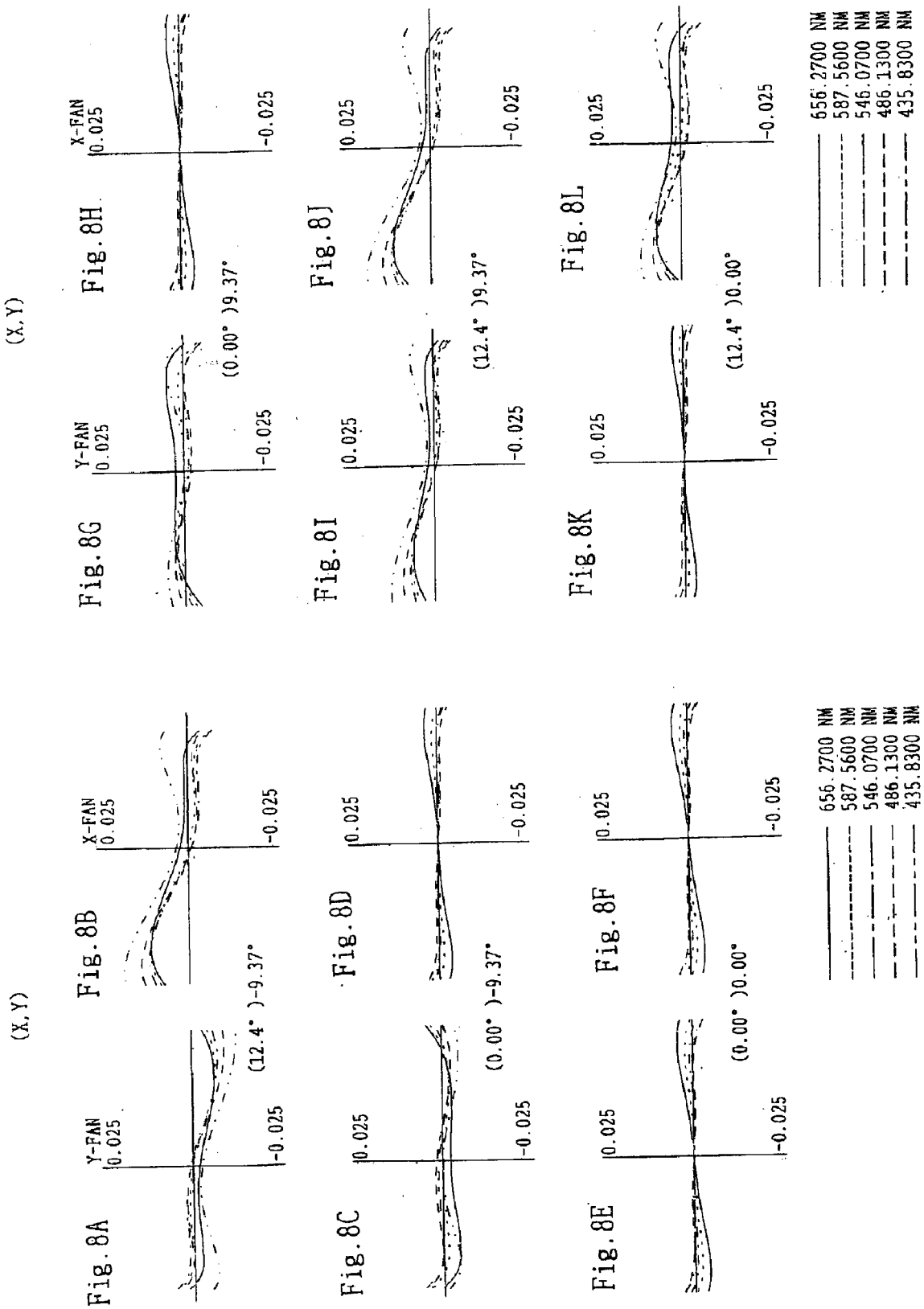
FIG. 8A is an aberration diagram that shows Y-direction lateral aberration of a chief ray that traverses a point where X-direction field angle is extreme in positive direction, or 12.4° and Y-direction field angle is extreme in negative direction, or −9.37° under the condition where the object distance is infinite at the telephoto end in the zoom optical system according to the first embodiment of the present invention.
FIG. 8B is an aberration diagram that shows X-direction lateral aberration of the chief ray that traverses the point where X-direction field angle is extreme in positive direction, or 12.4° and Y-direction field angle is extreme in negative direction, or −9.37° under the condition where the object distance is infinite at the telephoto end in the zoom optical system according to the first embodiment of the present invention.
FIG. 8C is an aberration diagram that shows Y-direction lateral aberration of a chief ray that traverses a point where X-direction field angle is zero and Y-direction field angle is extreme in negative direction, or −9.37° under the condition where the object distance is infinite at the telephoto end in the zoom optical system according to the first embodiment of the present invention.
FIG. 8D is an aberration diagram that shows X-direction lateral aberration of the chief ray that traverses the point where X-direction field angle is zero and Y-direction field angle is extreme in negative direction, or −9.37° under the condition where the object distance is infinite at the telephoto end in the zoom optical system according to the first embodiment of the present invention.
FIG. 8E is an aberration diagram that shows Y-direction lateral aberration of a chief ray that traverses a point where X-direction field angle is zero and Y-direction field angle is zero under the condition where the object distance is infinite at the telephoto end in the zoom optical system according to the first embodiment of the present invention.
FIG. 8F is an aberration diagram that shows X-direction lateral aberration of the chief ray that traverses the point where X-direction field angle is zero and Y-direction field angle is zero under the condition where the object distance is infinite at the telephoto end in the zoom optical system according to the first embodiment of the present invention.
FIG. 8G is an aberration diagram that shows Y-direction lateral aberration of a chief ray that traverses a point where X-direction field angle is zero and Y-direction field angle is extreme in positive direction, or 9.37° under the condition where the object distance is infinite at the telephoto end in the zoom optical system according to the first embodiment of the present invention.
FIG. 8H is an aberration diagram that shows X-direction lateral aberration of the chief ray that traverses the point where X-direction field angle is zero and Y-direction field angle is extreme in positive direction, or 9.37° under the condition where the object distance is infinite at the telephoto end in the zoom optical system according to the first embodiment of the present invention.
FIG. 8I is an aberration diagram that shows Y-direction lateral aberration of a chief ray that traverses a point where X-direction field angle is extreme in positive direction, or 12.4° and Y-direction field angle is extreme in positive direction, or 9.37° under the condition where the object distance is infinite at the telephoto end in the zoom optical system according to the first embodiment of the present invention.
FIG. 8J is an aberration diagram that shows X-direction lateral aberration of the chief ray that traverses the point where X-direction field angle is extreme in positive direction, or 12.4° and Y-direction field angle is extreme in positive direction, or 9.37° under the condition where the object distance is infinite at the telephoto end in the zoom optical system according to the first embodiment of the present invention.
FIG. 8K is an aberration diagram that shows Y-direct-ion lateral aberration of a chief ray that traverses a point where X-direction field angle is extreme in positive direction, or 12.4° and Y-direction field angle is zero under the condition where the object distance is infinite at the telephoto end in the zoom optical system according to the first embodiment of the present invention.
FIG. 8L is an aberration diagram that shows X-direction lateral aberration of the chief ray that traverses the point where X-direction field angle is extreme in positive direction, or 12.4° and Y-direction field angle is zero under the condition where the object distance is infinite at the telephoto end in the zoom optical system according to the first embodiment of the present invention.

Also, FIGS. 6 through FIGS. 8 show aberration diagrams of the zoom optical system according to the first embodiment, under the respective conditions where the object distance is infinite at the wide-angle end, where the object distance is infinite at the intermediate position, and where the object distance is infinite at the telephoto end. FIG. 6A shows a Y-direction lateral aberration of a chief ray that traverses a point where X-direction field angle is extreme in positive direction, or 24.9° and Y-direction field angle is extreme in negative direction, or −19.3°; FIG. 6B is an aberration diagram that shows X-direction lateral aberration of the chief ray that traverses the point where X-direction field angle is extreme in positive direction, or 24.9° and Y-direction field angle is extreme in negative direction, or −19.3°; FIG. 6C is an aberration diagram that shows Y-direction lateral aberration of a chief ray that traverses a point where X-direction field angle is zero and Y-direction field angle is extreme in negative direction, or −19.3°; FIG. 6D is an aberration diagram that shows X-direction lateral aberration of the chief ray that traverses the point where X-direction field angle is zero and Y-direction field angle is extreme in negative direction, or −19.3°; FIG. 6E is an aberration diagram that shows Y-direction lateral aberration of a chief ray that traverses a point where X-direction field angle is zero and Y-direction field angle is zero; FIG. 6F is an aberration diagram that shows X-direction lateral aberration of the chief ray that traverses the point where X-direction field angle is zero and Y-direction field angle is zero; FIG. 6G is an aberration diagram that shows Y-direction lateral aberration of a chief ray that traverses a point where X-direction field angle is zero and Y-direction field angle is extreme in positive direction, or 19.3°; FIG. 6H is an aberration diagram that shows X-direction lateral aberration of the chief ray that traverses the point where X-direction field angle is zero and Y-direction field angle is extreme in positive direction, or 19.3°; FIG. 6I is an aberration diagram that shows Y-direction lateral aberration of a chief ray that traverses a point where X-direction field angle is extreme in positive direction, or 24.9° and Y-direction field angle is extreme in positive direction, or 19.30; FIG. 6J is an aberration diagram that shows X-direction lateral aberration of the chief ray that traverses the point where X-direction field angle is extreme in positive direction, or 24.9° and Y-direction field angle is extreme in positive direction, or 19.3°; FIG. 6K is an aberration diagram that shows Y-direction lateral aberration of a chief ray that traverses a point where X-direction field angle is extreme in positive direction, or 24.9° and Y-direction field angle is zero; and FIG. 6L is an aberration diagram that shows X-direction lateral aberration of the chief ray that traverses the point where X-direction field angle is extreme in positive direction, or 24.9° and Y-direction field angle is zero. FIGS. 7 and FIGS. 8 also show lateral aberrations in the manner similar to FIGS. 6.

In the lens data of the first through fourth embodiments, "ASP" signifies aspherical surface, "FFS" signifies free-formed surface, "DM" signifies deformable mirror, and "OB" signifies object distance. Regarding refractive index and Abbe's number, values for d-line rays are listed. Regarding a variable space $D_i$ (i=1, 2, . . . ), values at the wide-angle end, at the intermediate position, and at the telephoto end are listed in this order. In the zoom optical system according to each embodiment, two plane parallel plates are inserted on the most image side. These are a cover glass of an image pickup element, an infrared cutoff filter, and a lowpass filter. In addition, $\eta_W$, $\eta_S$, and $\eta_T$ are magnifications of the group of lenses arranged between the deformable mirror and the image surface, at the wide-angle end, at the intermediate position, and the telephoto end, respectively.

First Embodiment

Focal length: 4.0 mm~7.0 mm~10.0 mm, Open F-number: 2.8~4.2

Dimensions of image pickup surface: 4.0 mm×3.0 mm

X-direction and Y-direction (Y is direction of decentration) focal lengths of deformable mirror at the proximity (OB= 300):

|   | X | Y |
|---|---|---|
| W | 813.0 | 925.9 |
| S | 305.8 | 359.7 |
| T | 134.4 | 152.0 |

Values in Conditions:
$EX_W/f_W=19.5$, $EX_S/f_S=10.4$, $EX_T/f_T=15.1$
$f_a$ (front group)$=-7.54$, $f_b$ (rear group)$=11.96$
$(f_a/f_b) \times f_W=-2.52$, $D=8.8$

| Surface Number | Radius of Curvature | Surface Separation | Decentration | Refractive Index | Abbe's Number |
|---|---|---|---|---|---|
| object surface | ∞ | ∞ | | | |
| 1 | 16.47 | 1.20 | | 1.7725 | 49.6 |
| 2 | 4.81 | 2.06 | | | |
| 3 | 162.21 | 0.80 | | 1.6180 | 63.3 |
| 4 | 8.65 | 0.24 | | | |
| 5 | 6.72 | 1.75 | | 1.8467 | 23.8 |
| 6 | ASP[1] | D1 = 10.11~3.53~2.08 | | | |
| 7 | stop surface | 1.00 | | | |
| 8 | 32.80 | 2.49 | | 1.6869 | 41.0 |
| 9 | −4.10 | 1.37 | | 1.8010 | 35.0 |
| 10 | −16.86 | D2 = 6.24~5.43~1.23 | | | |
| 11 | 16.08 | 2.22 | | 1.4970 | 81.5 |
| 12 | −8.88 | 1.07 | | | |
| 13 | −7.49 | 1.14 | | 1.8467 | 23.8 |
| 14 | ASP[2] | D3 = 1.00~8.38~14.03 | | | |
| 15 | −10.82 | 1.00 | | 1.8467 | 23.8 |
| 16 | −20.92 | 2.00 | | 1.7292 | 54.7 |
| 17 | ASP[3] | 4.00 | | | |
| 18 | FFS[1] (DM) | 0.00 | decentration[1] | | |
| 19 | ∞ | 4.43 | | | |
| 20 | ∞ | 1.00 | | 1.5477 | 62.8 |
| 21 | ∞ | 0.50 | | | |
| 22 | ∞ | 0.50 | | 1.5163 | 64.1 |
| 23 | ∞ | 0.50 | | | |
| image surface | ∞ | | | | |

ASP[1]

Radius of curvature 10.91   k 0.0000
a −4.5842 × 10$^{-4}$   b −2.1403 × 10$^{-6}$   c 6.6036 × 10$^{-7}$   d −2.8931 × 10$^{-8}$

ASP[2]

Radius of curvature −10.45   k 0.0000
a 5.6674 × 10$^{-5}$   b −2.2981 × 10$^{-6}$   c 1.2154 × 10$^{-7}$   d −6.0421 × 10$^{-9}$

ASP[3]

Radius of curvature −7.05   k −2.1588 × 10$^{-1}$
a 4.1176 × 10$^{-4}$   b 1.2627 × 10$^{-6}$   c 9.1551 × 10$^{-9}$   d 1.3215 × 10$^{-9}$ -continued

FFS[1]

|  | W OB = ∞ | S OB = ∞ | T OB = ∞ | W OB = 300 | S OB = 300 | T OB = 300 |
|---|---|---|---|---|---|---|
| $C_4$ | 0.000 | 0.000 | 0.000 | $-0.4312 \times 10^{-3}$ | $-0.1108 \times 10^{-2}$ | $-0.2613 \times 10^{-2}$ |
| $C_6$ | 0.000 | 0.000 | 0.000 | $-0.2273 \times 10^{-3}$ | $-0.5955 \times 10^{-3}$ | $-0.1381 \times 10^{-2}$ |
| $C_8$ | 0.000 | 0.000 | 0.000 | $0.4060 \times 10^{-4}$ | $0.1304 \times 10^{-3}$ | $0.2183 \times 10^{-3}$ |
| $C_{10}$ | 0.000 | 0.000 | 0.000 | $0.1992 \times 10^{-4}$ | $0.6697 \times 10^{-4}$ | $0.1230 \times 10^{-3}$ |
| $C_{11}$ | 0.000 | 0.000 | 0.000 | $-0.1372 \times 10^{-5}$ | $-0.2383 \times 10^{-4}$ | $-0.9181 \times 10^{-5}$ |
| $C_{13}$ | 0.000 | 0.000 | 0.000 | $-0.4923 \times 10^{-5}$ | $-0.2967 \times 10^{-4}$ | $-0.2217 \times 10^{-4}$ |
| $C_{15}$ | 0.000 | 0.000 | 0.000 | $-0.1499 \times 10^{-5}$ | $-0.9592 \times 10^{-5}$ | $-0.1017 \times 10^{-4}$ |

Decentration [1]

| X | 0.00 | Y | 0.00 | Z | 0.00 |
|---|---|---|---|---|---|
| α | 45.00 | β | 0.00 | γ | 0.00 |

|  | X | Y |
|---|---|---|
| W | 1298.7 | 1388.9 |
| S | 454.5 | 476.2 |
| T | 208.3 | 216.5 |

Second Embodiment

Focal length: 4.0 mm~7.0 mm~10.0 mm, Open F-number: 2.8~4.2
Dimensions of image pickup surface: 4.0 mm×3.0 mm
X-direction and Y-direction (Y is direction of decentration) focal lengths of deformable mirror at the proximity (OB= 300):

Values in Conditions:

$EX_W/f_W=6.2$, $EX_S/f_S=4.6$, $EX_T/f_T=3.0$
$\xi_W=0.62$, $\xi_S=0.62$, $\xi_T=0.62$
$f_a$ (front group)$=-8.27$, $f_b$ (rear group)$=29.51$
$(f_a/f_b) \times f_W=-1.12$, $D=9.0$

| Surface Number | Radius of Curvature | Surface Separation | Decentration | Refractive Index | Abbe's Number |
|---|---|---|---|---|---|
| object surface | ∞ | ∞ |  |  |  |
| 1 | 23.31 | 1.20 |  | 1.7725 | 49.6 |
| 2 | 4.74 | 1.97 |  |  |  |
| 3 | -52.35 | 1.29 |  | 1.7433 | 49.3 |
| 4 | ASP[1] | 0.52 |  |  |  |
| 5 | 11.52 | 5.16 |  | 1.8467 | 23.8 |
| 6 | -66.74 | D1 = 11.10~3.25~1.04 |  |  |  |
| 7 | stop surface | 1.00 |  |  |  |
| 8 | 56.17 | 5.40 |  | 1.7034 | 52.8 |
| 9 | -5.63 | 1.50 |  | 1.7644 | 38.2 |
| 10 | -23.83 | D2 = 6.39~5.77~1.00 |  |  |  |
| 11 | ASP[2] | 4.00 |  | 1.6883 | 53.4 |
| 12 | -22.28 | 0.15 |  |  |  |
| 13 | 23.11 | 2.00 |  | 1.7615 | 50.6 |
| 14 | -19.32 | 1.00 |  | 1.7269 | 32.5 |
| 15 | 9.72 | D3 = 4.50~12.96~19.95 |  |  |  |
| 16 | FFS[1] (DM) | 4.50 | decentration[1] |  |  |
| 17 | ASP[3] | 3.20 |  | 1.6935 | 53.2 |
| 18 | -61.27 | 1.48 |  |  |  |
| 19 | ∞ | 1.00 |  | 1.5477 | 62.8 |
| 20 | ∞ | 0.50 |  |  |  |
| 21 | ∞ | 0.50 |  | 1.5163 | 64.1 |
| 22 | ∞ | 0.50 |  |  |  |
| image surface | ∞ |  |  |  |  |

ASP[1]

Radius of curvature 9.11  k $8.6365 \times 10^{-1}$
a $-8.8266 \times 10^{-4}$  b $-1.9953 \times 10^{-6}$  c $-3.6159 \times 10^{-7}$  d $-1.2075 \times 10^{-8}$

ASP [2]

Radius of curvature 18.26  k 2.6780
a $-1.4977 \times 10^{-4}$  b $1.4241 \times 10^{-6}$  c $-1.7758 \times 10^{-7}$  d $5.8316 \times 10^{-9}$ -continued

ASP[3]

Radius of curvature 10.67    k 0.0000
a $-1.8514 \times 10^{-4}$   b $-3.7065 \times 10^{-6}$   c $1.3231 \times 10^{-7}$   d $-5.1639 \times 10^{-9}$

FFS[1]

|  | W OB = ∞ | S OB = ∞ | T OB = ∞ | W OB = 300 | S OB = 300 | T OB = 300 |
|---|---|---|---|---|---|---|
| $C_4$ | 0.000 | 0.000 | 0.000 | $-0.2717 \times 10^{-3}$ | $-0.7620 \times 10^{-3}$ | $-0.1704 - 10^{-2}$ |
| $C_6$ | 0.000 | 0.000 | 0.000 | $-0.1354 \times 10^{-3}$ | $-0.3933 \times 10^{-3}$ | $-0.8725 \times 10^{-3}$ |
| $C_8$ | 0.000 | 0.000 | 0.000 | $0.1001 \times 10^{-4}$ | $0.2991 \times 10^{-4}$ | $0.5158 \times 10^{-4}$ |
| $C_{10}$ | 0.000 | 0.000 | 0.000 | $0.4227 \times 10^{-5}$ | $0.1350 \times 10^{-4}$ | $0.2646 \times 10^{-4}$ |
| $C_{11}$ | 0.000 | 0.000 | 0.000 | $-0.8646 \times 10^{-6}$ | $-0.7241 \times 10^{-5}$ | $0.2807 \times 10^{-5}$ |
| $C_{13}$ | 0.000 | 0.000 | 0.000 | $-0.1088 \times 10^{-5}$ | $-0.5882 \times 10^{-5}$ | $0.5567 \times 10^{-5}$ |
| $C_{15}$ | 0.000 | 0.000 | 0.000 | $-0.3590 \times 10^{-6}$ | $-0.1756 \times 10^{-5}$ | $0.2367 \times 10^{-6}$ |

Decentration [1]

| X | 0.00 | Y | 0.00 | Z | 0.00 |
|---|---|---|---|---|---|
| α | 45.00 | β | 0.00 | γ | 0.00 |

Each of the zoom optical systems according to the first and second embodiments includes, in order from the object side, a first group G1 having a negative power and fixed in a zooming operation, a second group G2 having a positive power, a third group G3 having a positive power, and a fourth group G4 having a positive power. In a magnification change from the wide-angle end to the telephoto end, the second group G2 and the third group G3 are moved toward the object side separately from each other. By doing so, magnification change and compensation for a fluctuation of the in-focus position caused by the magnification change are performed. Also, the configuration is made so that focusing can be performed by a deformable mirror DM arranged in the fourth group G4.

In the zoom optical system according to the first embodiment, the deformable mirror is disposed on the most image side in the fourth group G4. In the zoom optical system according to the second embodiment, the fourth group G4 is configured to arrange, in order from the object side, the deformable mirror and a positive lens.

Third Embodiment

Focal length: 4.0 mm~7.0 mm~10.0 mm, Open F-number: 2.8~4.4

Dimensions of image pickup surface: 4.0 mm×3.0 mm

X-direction and Y-direction (Y is direction of decentration) focal lengths of deformable mirror at the proximity (OB=300):

|  | X | Y |
|---|---|---|
| W | 1098.9 | 1149.4 |
| S | 383.1 | 398.4 |
| T | 191.6 | 199.2 |

Values in Conditions:

$EX_W/f_W=3.2$, $EX_S/f_S=2.8$, $EX_T/f_T=2.6$
$\xi_W=0.65$, $\xi_S=0.66$, $\xi_T=0.66$
$f_a$ (front group)$=-7.68$, $f_b$ (rear group)$=13.75$
$(f_a/f_b) \times f_W=-2.23$, $D=8.7$

| Surface Number | Radius of Curvature | Surface Separation | Decentration | Refractive Index | Abbe's Number |
|---|---|---|---|---|---|
| object surface | ∞ | ∞ |  |  |  |
| 1 | 19.62 | 1.20 |  | 1.7725 | 49.6 |
| 2 | 3.95 | 1.92 |  |  |  |
| 3 | 259.50 | 0.87 |  | 1.7433 | 49.3 |
| 4 | ASP[1] | 0.78 |  |  |  |
| 5 | 14.23 | 2.09 |  | 1.8467 | 23.8 |
| 6 | -50.48 | D1 = 9.59~3.49~1.05 |  |  |  |
| 7 | stop surface | 1.00 |  |  |  |
| 8 | 14.29 | 2.61 |  | 1.6843 | 36.5 |
| 9 | -4.00 | 1.42 |  | 1.7813 | 35.0 |
| 10 | 34.35 | 1.22 |  |  |  |
| 11 | ASP[2] | 2.03 |  | 1.7386 | 51.4 |
| 12 | -8.89 | 0.15 |  |  |  |
| 13 | 27.38 | 2.00 |  | 1.7767 | 50.1 |
| 14 | -8.76 | 1.00 |  | 1.7065 | 29.5 |
| 15 | 8.70 | D2 = 4.50~11.30~18.06 |  |  |  |
| 16 | FFS[1] (DM) | 4.59 | decentration[1] |  |  |
| 17 | 9.45 | 2.69 |  | 1.6935 | 53.2 |
| 18 | ASP[3] | 1.00 |  |  |  |
| 19 | ∞ | 1.00 |  | 1.5477 | 62.8 |
| 20 | ∞ | 0.50 |  |  |  |
| 21 | ∞ | 0.50 |  | 1.5163 | 64.1 |

-continued

| | | |
|---|---|---|
| 22 | ∞ | 0.50 |
| image surface | ∞ | |

ASP[1]

Radius of curvature 9.68  k −2.4920
a −7.8720 × 10⁻⁴   b −3.4128 × 10⁻⁵   c 1.4344 × 10⁻⁶   d −2.0198 × 10⁻⁷

ASP[2]

Radius of curvature 20.64  k −5.6838
a −3.9523 × 10⁻⁴   b 7.6145 × 10⁻⁶   c −4.4208 × 10⁻⁷   d 1.7720 × 10⁻⁸

ASP[3]

Radius of curvature −154.68  k −3.2742 × 10²³
a 3.0474 × 10⁻⁴   b −1.8266 × 10⁻⁵   c 1.9831 × 10⁻⁶   d −7.4439 × 10⁻⁸

FFS[1]

| | W OB = ∞ | S OB = ∞ | T OB = ∞ | W OB = 300 | S OB = 300 | T OB = 300 |
|---|---|---|---|---|---|---|
| $C_4$ | 0.000 | 0.000 | 0.000 | −0.3230 × 10⁻³ | −0.9158 × 10⁻³ | −0.1831 × 10⁻² |
| $C_6$ | 0.000 | 0.000 | 0.000 | −0.1663 × 10⁻³ | −0.4744 × 10⁻³ | −0.9507 × 10⁻³ |
| $C_8$ | 0.000 | 0.000 | 0.000 | 0.9096 × 10⁻⁵ | 0.2975 × 10⁻⁴ | 0.6359 × 10⁻⁴ |
| $C_{10}$ | 0.000 | 0.000 | 0.000 | 0.5969 × 10⁻⁵ | 0.1655 × 10⁻⁴ | 0.3414 × 10⁻⁴ |
| $C_{11}$ | 0.000 | 0.000 | 0.000 | 0.7262 × 10⁻⁶ | −0.4247 × 10⁻⁵ | −0.6693 × 10⁻⁵ |
| $C_{13}$ | 0.000 | 0.000 | 0.000 | 0.4576 × 10⁻⁵ | 0.1657 × 10⁻⁶ | −0.2643 × 10⁻⁵ |
| $C_{15}$ | 0.000 | 0.000 | 0.000 | 0.1261 × 10⁻⁶ | −0.1100 × 10⁻⁵ | −0.1896 × 10⁻⁵ |

Decentration [1]

| X | 0.00 | Y | 0.00 | Z | 0.00 |
|---|---|---|---|---|---|
| α | 45.00 | β | 0.00 | γ | 0.00 |

The zoom optical system according to the third embodiment includes, in order from the object side, a first group G1 having a negative power, a second group G2 having a positive power, and a third group G3 having a positive power. A magnification change is made by moving the first group G1 and the second group G2 in the direction of the optical axis. In a magnification change from the wide-angle end to the telephoto end, the second group G2 is moved toward the object side. Fluctuation of the in-focus position caused by the magnification change is compensated for by moving the first group G1 long a locus that is convex toward the image side. Also, the configuration is made so that focusing can be performed by a deformable mirror DM arranged in the third group G3.

Figure 5:
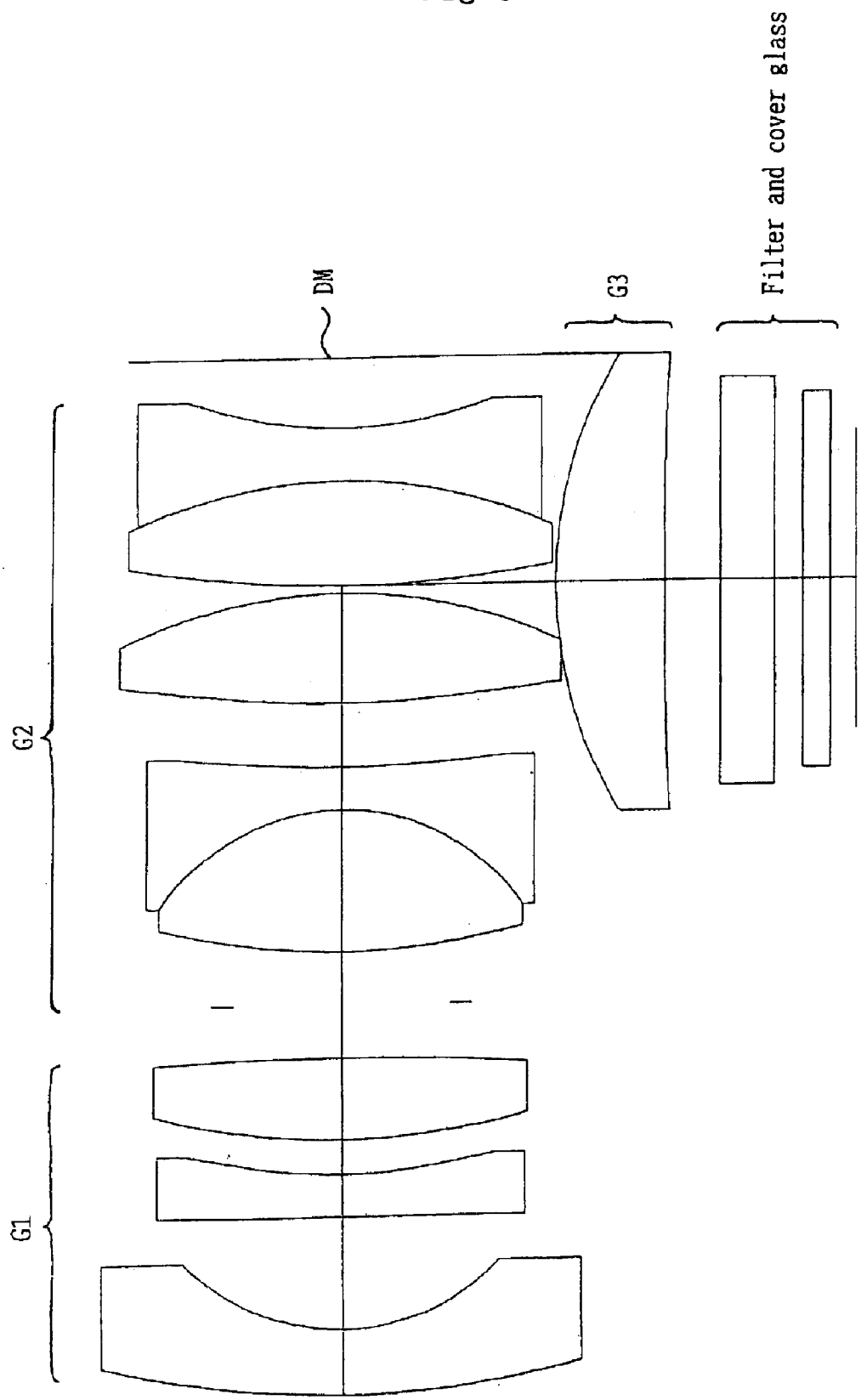
FIG. 5 is sectional view that shows the state where the optical system of the zoom optical system according to the third embodiment of the present invention is compactly folded in storage.

FIG. 5 shows the state where the optical system of the zoom optical system according to the third embodiment is compactly folded and housed. In the third embodiment, the deformable mirror is moved so that its mirror surface is perpendicular to the optical axis of the first group and the second group. This configuration contrives a storage space for the first group G1 and the second group G2. In this way, according to the zoom optical system of the third embodiment, it is possible to realize an optical system that is compact in storage.

Fourth Embodiment

Focal length: 4.5 mm~9.0 mm~13.5 mm, Open F-number: 2.8~4.8
Dimensions of image pickup surface: 4.48 mm×3.36 mm
X-direction and Y-direction (Y is direction of decentration) focal lengths of deformable mirror at the proximity (OB= 300):

| | X | Y |
|---|---|---|
| W | 840.3 | 943.4 |
| S | 219.8 | 245.7 |
| T | 99.3 | 109.3 |

Values in Conditions:
$EX_W/f_W=3.8$, $EX_S/f_S=2.9$, $EX_T/f_T=2.8$
$f_a$ (front group)=−9.25, $f_b$ (rear group)=14.67
$(f_a/f_b) \times f_W = -2.84$, D=11.1

| Surface Number | Radius of Curvature | Surface Separation | Decentration | Refractive Index | Abbe's Number |
|---|---|---|---|---|---|
| object surface | ∞ | ∞ | | | |
| 1 | 43.06 | 4.00 | | 1.7725 | 49.6 |
| 2 | ∞ | D1 = 1.00~8.25~8.93 | | | |
| 3 | 19.74 | 1.00 | | 1.7725 | 49.6 |
| 4 | 7.15 | 2.96 | | | |
| 5 | 432.39 | 1.00 | | 1.4875 | 70.2 |
| 6 | 19.19 | 4.50 | | | |
| 7 | −9.25 | 1.00 | | 1.4875 | 70.2 |
| 8 | 21.83 | 3.50 | | 1.8052 | 25.4 |

-continued

| | | | | |
|---|---|---|---|---|
| 9 | −103.66 | D2 = 8.93~1.68~1.00 | | |
| 10 | stop surface | D3 = 10.98~5.98~0.80 | | |
| 11 | ASP[1] | 3.00 | 1.5891 | 61.3 |
| 12 | −13.72 | 0.20 | | |
| 13 | −26.29 | 3.00 | 1.7725 | 49.6 |
| 14 | −163.98 | 1.00 | 1.8010 | 35.0 |
| 15 | 61.02 | D4 = 2.15~2.45~2.00 | | |
| 16 | −39.10 | 1.20 | 1.8075 | 26.4 |
| 17 | 16.03 | 0.20 | | |
| 18 | ASP[2] | 4.63 | 1.5891 | 61.1 |
| 19 | −10.62 | 0.15 | | |
| 20 | −28.14 | 3.50 | 1.7322 | 27.6 |
| 21 | −6.28 | 1.00 | 1.8173 | 29.2 |
| 22 | −19.35 | D5 = 5.00~9.71~15.33 | | |
| 23 | FF5[1] (DM) | 5.00 | decentration[1] | |
| 24 | ∞ | 0.40 | 1.5163 | 64.1 |
| 25 | ∞ | 0.90 | 1.5477 | 62.8 |
| 26 | ∞ | 0.40 | | |
| 27 | ∞ | 0.38 | 1.5163 | 64.1 |
| 28 | ∞ | 0.50 | | |
| image surface | ∞ | | | |

ASP[1]

Radius of curvature 12.23   $k\ 2.6846 \times 10^{-1}$
$a\ -1.4355 \times 10^{-4}$   $b\ -3.6950 \times 10^{-6}$   $c\ 6.4302 \times 10^{-8}$   $d\ -1.0561 \times 10^{-9}$

ASP[2]

Radius of curvature 9.59   $k\ -4.9694$
$a\ 1.9685 \times 10^{-4}$   $b\ -5.9577 \times 10^{-6}$   $c\ 1.3864 \times 10^{-7}$   $d\ -1.0045 \times 10^{-9}$

FFS[1]

| | W OB = ∞ | S OB = ∞ | T OB = ∞ | W OB = 300 | S OB = 300 | T OB = 300 |
|---|---|---|---|---|---|---|
| $C_4$ | 0.000 | 0.000 | 0.000 | $-0.4174 \times 10^{-3}$ | $-0.1591 \times 10^{-2}$ | $-0.3530 \times 10^{-2}$ |
| $C_6$ | 0.000 | 0.000 | 0.000 | $-0.2283 \times 10^{-3}$ | $-0.8523 \times 10^{-3}$ | $-0.1858 \times 10^{-2}$ |
| $C_8$ | 0.000 | 0.000 | 0.000 | $0.3750 \times 10^{-4}$ | $0.1378 \times 10^{-3}$ | $0.2460 \times 10^{-3}$ |
| $C_{10}$ | 0.000 | 0.000 | 0.000 | $0.2178 \times 10^{-4}$ | $0.7433 \times 10^{-4}$ | $0.1351 \times 10^{-3}$ |
| $C_{11}$ | 0.000 | 0.000 | 0.000 | $-0.1816 \times 10^{-5}$ | $-0.9126 \times 10^{-5}$ | $-0.1579 \times 10^{-4}$ |
| $C_{13}$ | 0.000 | 0.000 | 0.000 | $-0.3857 \times 10^{-5}$ | $-0.1775 \times 10^{-4}$ | $-0.2547 \times 10^{-4}$ |
| $C_{15}$ | 0.000 | 0.000 | 0.000 | $-0.1527 \times 10^{-5}$ | $-0.5854 \times 10^{-5}$ | $-0.1071 \times 10^{-4}$ |

Decentration [1]

| X | 0.00 | Y | 0.00 | Z | 0.00 |
|---|---|---|---|---|---|
| α | 45.00 | β | 0.00 | γ | 0.00 |

The zoom optical system according to the fourth embodiment includes, in order from the object side, a first group G1 having a positive power, a second group G2 having a negative power, a third group G3 having a positive power, and a fourth group G4 having a positive power. A magnification change is made by moving the second group G2, the third group G3 and the fourth group G4. That is, the second group G2, the third group G3 and the fourth group G4 are given a magnification varying function. Also, the first group and the aperture stop are fixed in a magnification change. In addition, configuration is made so that focusing is performed by a deformable mirror DM disposed on the image side of the fourth group G4.

The zoom optical system according to the fourth embodiment also is a zoom-type lens system typically used as the lens system for a video camera. Also, this is one of the types applicable to digital cameras. That is, this zoom optical system is based on a type of lens system composed of a positive first group, a negative second group and a positive third group.

While the angle Φ of turning of the optical axis caused by the deformable mirror is 90° in most of the embodiments set forth above, it is not limited to this value. Although a smaller value of angle Φ causes smaller aberrations and thus is favorable, too small a value causes competition with electronic devices, optical devices etc for a space. On the other hand, a larger value of angle Φ makes it easy to secure a space for device arrangement, but increases aberrations. Therefore, the angle Φ of turning of the optical axis caused by the deformable mirror preferably satisfies the following condition:

$$70° \leq \Phi \leq 110°$$

In addition, it is much preferable that the following condition is satisfied:

$$80° \leq \Phi \leq 100°$$

As stated above, the zoom optical system according to the present invention uses a variable optical-property optical element. Consequently, zooming action is smoother than a magnification change by a motor. In addition, operation noise is small and power consumption is small. Furthermore, it is not necessary to provide a motor or a driving circuit to activate the motor. Also, since the mechanical structure for moving lenses is simple, a space for providing the mechanical structure is allowed to be small. As a result, even if a zoom optical system is used, bulkiness of the apparatus is avoidable.

All of the descriptions above relate to the optical system using a deformable mirror. However, in a case where an ordinary (non-deformable) mirror is used in place of the deformable mirror, also, the conditional expressions and limitations set forth above may be applied unless they specifically cause inconvenience.

This is because the merit of compactness contributed by the folded design of the optical system using a mirror remains as it is in this case also.

The zoom optical system according to the present invention as described above is applicable to a film camera, a digital camera, a TV camera, a camera for a personal data assistant, a monitor camera, robot eyes, an electronic endoscope, etc.

Regarding the zoom optical system set forth above, the description has been made of the type configured to have a reflecting surface in a lens group. However, regarding a zoom optical system having no reflecting surface also, use of an optical element having a deformable surface, for example, a variable focus lens can achieve effects such as size reduction, cost reduction, power saving, and operation noise reduction. Moreover, a variable focus mirror that has no deformable surface is applicable to the embodiments set forth above.

Regarding the variable focus mirror, one example is explained in reference FIG. 24, later.

Hereafter, explanation is made of configuration examples of the deformable mirror applicable to the zoom optical system according to the present invention.

Figure 9:
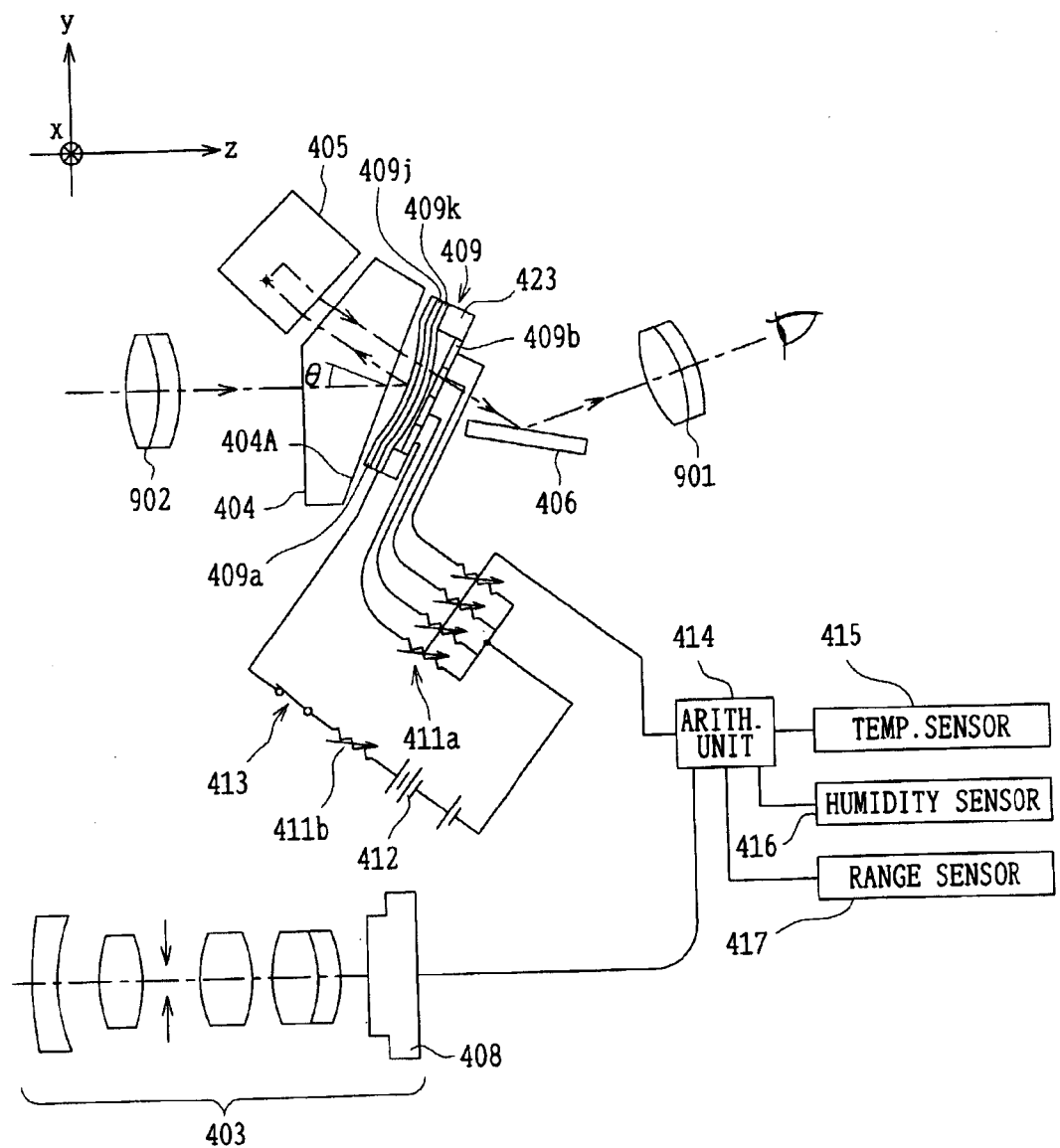
FIG. 9 is a schematic configuration diagram of a digital camera's Keplerian finder using a variable optical-property mirror as the variable mirror applicable to the zoom optical system according to the present invention.

FIG. 9 is a schematic configuration diagram that shows a digital camera's Keplerian finder using a variable optical-property mirror, as a variable mirror that is applicable to the zoom optical system according to the present invention. This configuration example is applicable to a silver halide film camera, as a matter of course. Reference is first made to a variable optical-property deformable mirror 409.

The variable optical-property deformable mirror 409 is a variable optical-property deformable mirror (hereafter simply called a deformable mirror) in which the periphery of a deformable three-layer structure composed of an electrode 409k, a deformable substrate 409j, and a thin film (reflecting surface) 409a, which is an aluminum coating formed on the substrate 409j and functions as a reflecting surface, is fixed on a support 423, and a plurality of electrodes 409b provided in a spaced relation with the electrode 409k are fixed on the lower side of the support 423. The reference numeral 411a denotes a plurality of variable resistors connected with the electrodes 409b, respectively. The reference numeral 412 denotes a power supply connected, as interposed between, with the electrode 409k and the electrodes 409b through variable resistors 411b and a power switch 413. The reference numeral 414 denotes an arithmetical unit for controlling resistance values of the plurality of variable resistors 411a. The reference numerals 415, 416, and 417 denote a temperature sensor, a humidity sensor, and a range sensor, respectively, connected with the arithmetical unit 414. These members and elements are arranged as shown in the figure, to constitute an optical apparatus.

Each of surfaces of an objective lens 902, an eyepiece 901, a prism 404, a rectangular isosceles prism 405, a mirror 406 and the deformable mirror 409 may have, not necessarily limited to planer surfaces, any shape such as a spherical or rotationally symmetric aspherical surface, a spherical, planar or rotationally symmetric aspherical surface that has a decentration in reference to the optical axis, an aspherical surface that defines planes of symmetry, only one plane of symmetry or no plane of symmetry, a free-formed surface, and a surface having a nondifferentiable point or line. In addition, irrespective of whether it is a reflecting surface or a refracting surface, any surface is applicable as long as it can exert some effect on light. Hereafter, such a surface is generally referred to as an expanded curved surface. It is noted that decentration implies either one or both of displacement (shift) and tilt.

Also, it is designed so that, when a voltage is applied between the plurality of electrodes 409b and the electrode 409k, the thin film 409a is deformed by electrostatic force to change its surface shape, as in the case of the membrane mirror referred to, for example, in "Handbook of Microlithography, Micromachining and Microfabriation", edited by P. Rai-Choudhury, Vol. 2: Micromachining and Microfabriation, p. 495, FIG. 8. 58, SPIE PRESS or "Optics Communication", Vol. 140, pp. 187–190, 1997. Whereby, not only can focus adjustment be made in conformance with diopter of an observer, but also it is possible to suppress degradation of image forming performance, which results from deformation or change of refractive indices of the lenses 901 and 902 and/or the prism 404, the rectangular isosceles prism 405 and the mirror 406 caused by temperature change or humidity change, from expansion/contraction and deformation of lens frames, or from assembling errors of parts such as optical elements and frames. In this way, focus adjustment and compensation for aberrations caused by the focus adjustment can always be performed appropriately.

Figure 11:
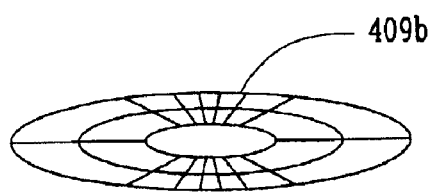
FIG. 11 is an explanatory diagram that shows one aspect of electrodes used in the deformable mirror shown in FIG. 10.
Figure 12:
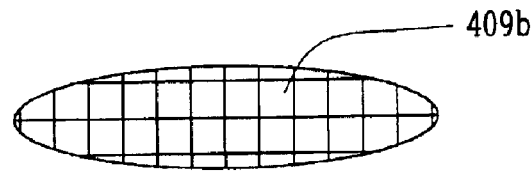
FIG. 12 is an explanatory diagram that shows another aspect of electrodes used in the deformable mirror shown in FIG. 10.

Also, the profile of the electrodes 409b has a concentric or rectangular division pattern as shown in FIGS. 11 and 12, and may be selected in accordance with deformation pattern of the thin film 409a In the case where the deformable mirror 409 is used, light from the object is refracted at each of entrance surfaces and exit surfaces of the objective lens 902 and the prism 404, is reflected at the deformable mirror 409, is transmitted through the prism 404, is further reflected at the rectangular isosceles prism 405 (in FIG. 9, the mark "+" on the path of rays indicates that rays travel toward the rear side of the figure), is reflected at the mirror 406, and enters the observer's eye via the eyepiece 901. In this way, the lenses 901 and 902, the prisms 404 and 405, and the deformable mirror 409 constitute an observation optical system of the optical apparatus. Optimizing the surface shape and thickness of each of these optical elements can minimize aberrations on the object surface.

In other words, the shape of the thin film 409a, which functions as a reflecting surface, is controlled in such a manner that resistance values of the variable resistors 411a are changed by signals from the arithmetical unit 414, to optimize image forming performance. Signals that have intensities according to ambient temperature, humidity and distance to the object are input into the arithmetical unit 414 from the temperature sensor 415, the humidity sensor 416, and the range sensor 417. In order to compensate for degradation of image forming performance caused by the ambient temperature and humidity and the distance to the object, the arithmetical unit 414 outputs signals for determining resistance values of the variable resistors 411a upon taking into account these input signals, so that voltages which determine the shape of the thin film 409a are applied to the electrodes 409b. In this way, since the thin film 409a is deformed by voltages applied to the electrodes 409b, or electrostatic force, it can assume various shapes including aspherical surfaces in accordance with conditions.

It is noted that the range sensor 417 is dispensable. In this case, it is only necessary to move the imaging lens 403, which is provided as the imaging optical system of the digital camera, to the position where high-frequency components of an image signal from a solid-state image sensor 408 are substantially maximized, to calculate the object distance on the basis of this position, and to deform the deformable mirror 409 so that an observer's eye is focused on the object image.

Also, if the deformable substrate 409j is made of synthetic resin such as polyimide, it is favorable in that the thin film could be considerably deformed even at a low voltage. Also, to integrally form the prism 404 and the deformable mirror 409 into a unit is convenient for assembly.

In the example of FIG. 9, since the reflecting surface 409*a* and the deformable electrode 409*k* are integrally formed as spaced via the deformable substrate 409*j* sandwiched between, there is a merit of choice from several manufacturing methods. Also, the reflecting surface 409*a* may be designed to be used as the electrode 409*k* also. In this case, since these two are configured into one, the structure is simplified, which is a merit.

Although not shown in the figure, the solid-state image sensor 408 may be integrally formed on the substrate of the deformable mirror 409 by a lithography process.

Also, if the lenses 901 and 902, the prisms 404 and 405, and the mirror 406 are formed with plastic molds, curved surfaces with any desirable shapes can be easily formed and the fabrication also is simple. In the above description, the lenses 901 and 902 are arranged separately from the prism 404. However, if the prisms 404 and 405, the mirror 406, and the deformable mirror 409 can be designed to eliminate aberrations without the lenses 902 and 901, the prisms 404 and 405 and the deformable mirror 409 will form one optical block, to facilitate assembling. A part or all of the lenses 901 and 902, the prisms 404 and 405, and the mirror 406 may be made of glass. Such a configuration would assure an imaging system having a better accuracy. The reflecting surface of the deformable mirror preferably is shaped as a free-formed surface, because thereby compensation for aberration is facilitated and thus is advantageous.

In the example of FIG. 9, although the arithmetical unit 404, the temperature sensor 415, the humidity sensor 416, and the range sensor 417 are provided so that temperature change, humidity change, and change of the object distance are compensated for by the deformable mirror 409, the system configuration is not necessarily limited to this specific one. That is, the arithmetical unit 414, the temperature sensor 415, the humidity sensor 416 and the range sensor 417 may be removed from the configuration so that the deformable mirror 409 compensates for change of the observer's diopter alone.

Figure 10:
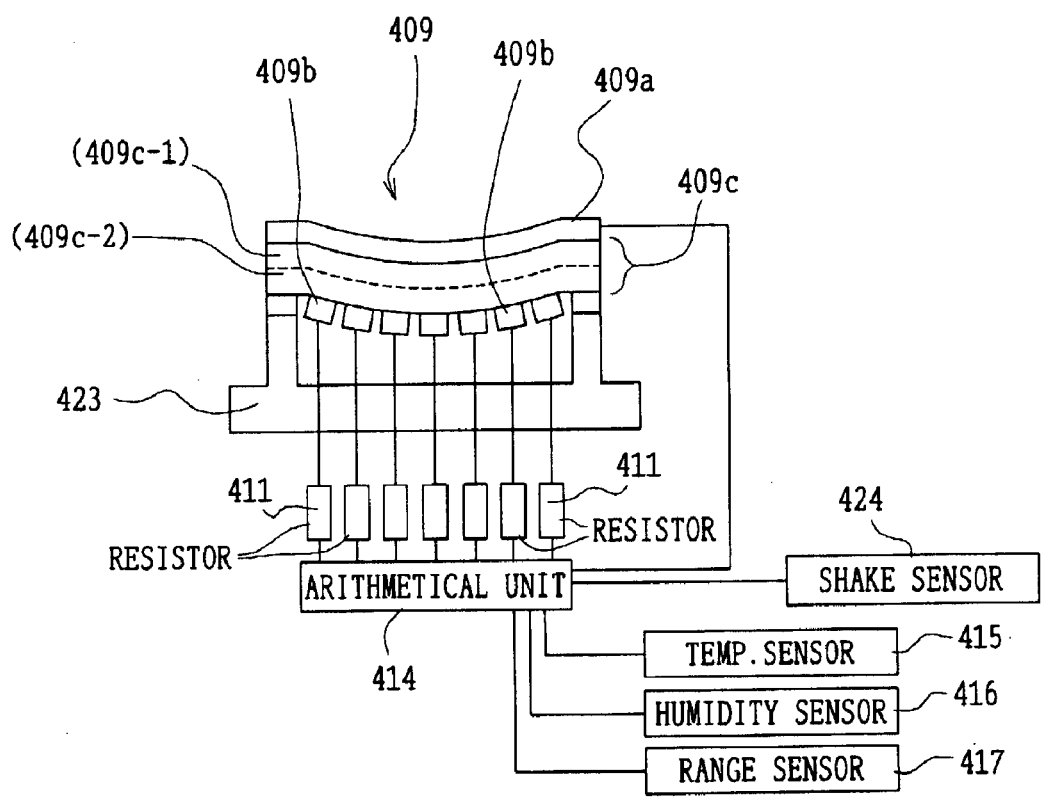
FIG. 10 is a schematic configuration diagram that shows another example of the deformable mirror 409 applicable as the deformable mirror used in the zoom optical system according to the present invention.

FIG. 10 is a schematic configuration diagram that shows another example of the deformable mirror 409 applicable as a variable mirror used in the zoom optical system according to the present invention.

In the deformable mirror 409 of this example, a piezoelectric element 409*c* is interposed between the thin film 409*a* and the electrodes 409*b*, and these elements are mounted on a support 423. By changing voltages applied to the piezoelectric element 409*c* for individual electrodes 409*b* to cause different expansion or contraction in the piezoelectric element 409*c* portion by portion, the configuration allows the shape of the thin film 409*a* to be changed. Arrangement of the electrodes 409*b* may be chosen from a concentric division pattern as illustrated in FIG. 11, a rectangular division pattern as illustrated in FIG. 12, and any other appropriate pattern.

In FIG. 10, the reference numeral 424 denotes a shake sensor connected with the arithmetical unit 414. The shake sensor 424 detects, for example, shake of a digital camera in photographing and changes voltages applied to the electrodes 409*b* via the arithmetical unit 414 and the variable resistors 411 so as to deform the thin film (reflecting surface) 409*a* for compensation for disturbance of the image by the shake. In this situation, focusing and compensation for temperature and humidity are performed upon signals from the temperature sensor 415, the humidity sensor 416, and the range sensor 417 also being taken into account simultaneously. In this case, since a stress that derives from the deformation of the piezoelectric element 409*c* is applied to the thin film 409*a*, it is good practice to give the thin film 409*a* a considerable thickness to have an appropriate strength. It is noted that the piezoelectric element 409*c* may have, as described later, a two-layer structure denoted by 409*c*-1 and 409*c*-2, depending on materials used.

Figure 13:
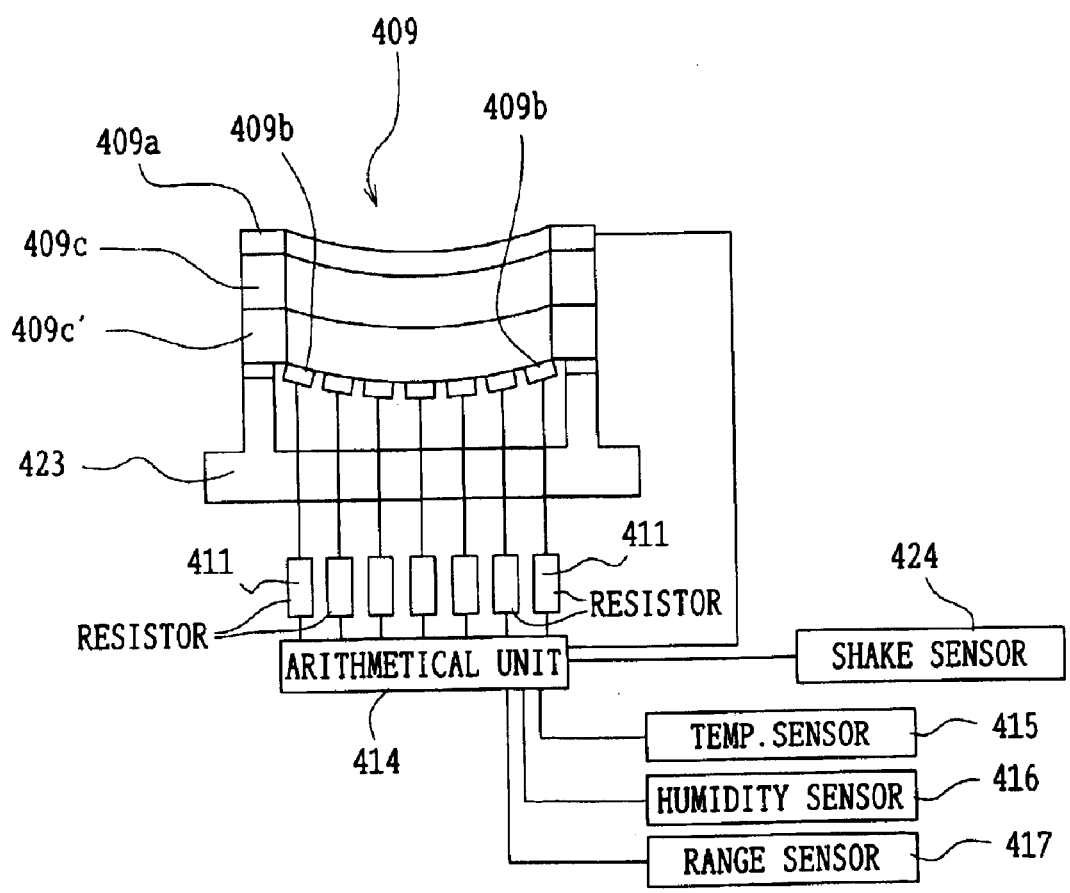
FIG. 13 is a schematic configuration diagram that shows still another example of the deformable mirror 409 applicable as the deformable mirror used in the zoom optical system according to the present invention.

FIG. 13 is a schematic configuration diagram that shows still another example of the deformable mirror 409 applicable as a variable mirror used in the zoom optical system according to the present invention.

The deformable mirror of this example differs from the deformable mirror shown in FIG. 10 in that the piezoelectric element interposed between the thin film 409*a* and the plurality of electrodes 409*b* is composed of two piezoelectric elements 409*c* and 409*c'* made of substances having piezoelectric characteristics of opposite directionalities. Specifically, if the piezoelectric elements 409*c* and 409*c'* are made of ferroelectric crystals, they are arranged so that the crystal axes thereof are directed opposite to each other. In this case, when voltages are applied, since the piezoelectric elements 409*c* and 409*c'* expand or contract in opposite directions, the force to deform the thin film (reflecting surface) 409*a* becomes stronger than in the example of FIG. 10, to result in an advantage that the mirror surface can be considerably deformed. Other reference numerals in FIG. 13 are the same as those in FIG. 10.

Substances usable to construct the piezoelectric elements 409*c* and 409*c'* are, for example, piezoelectric substances or polycrystals or crystals thereof such as barium titanate, Rochelle salt, quartz crystal, tourmaline, KDP, ADP and lithium niobite; piezoelectric ceramics such as solid solution of $PbZrO_3$ and $PbTiO_3$; organic piezoelectric substances such as PVDF; and other ferroelectrics. In particular, the organic piezoelectric substance is preferable because it has a small value of Young's modulus and brings about a considerable deformation at a low voltage. In application of these piezoelectric elements, if they are made to have uneven thickness, it also is possible to properly deform the thin film 409*a* in each of the examples set forth above.

Also, as materials of the piezoelectric elements 409*c* and 409*c'*, macromolecular piezoelectric such as polyurethane, silicon rubber, acrylic elastomer, PZT, PLZT, and PVDF; vinylidene cyanide copolymer, copolymer of vinylidene fluoride and trifluoroethylene; etc. are usable.

Use of the organic substance having a piezoelectric property, the synthetic resin having a piezoelectric property, or the elastomer having a piezoelectric property is favorable because a considerable deformation of the surface of the deformable mirror can be achieved.

Figure 14:
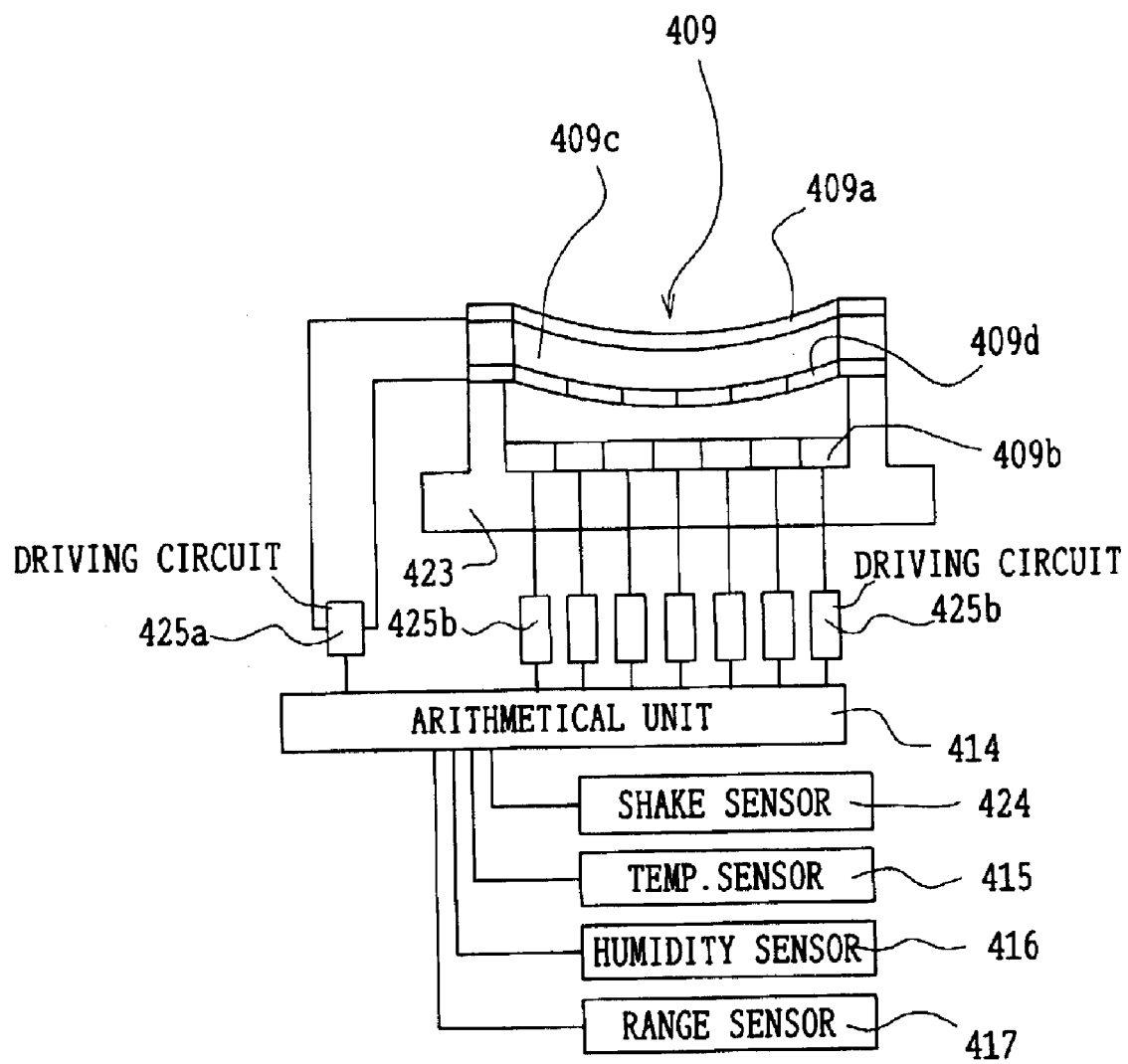
FIG. 14 is a schematic configuration diagram that shows still another example of the deformable mirror 409 applicable as the deformable mirror used in the zoom optical system according to the present invention.

In the case where an electrostrictive substance such as acrylic elastomer or silicon rubber is used for the piezoelectric element 409*c* shown in FIGS. 10 and 14, the piezoelectric element 409*c* may have the structure in which another substrate 409*c*-1 and the electrostrictive substance 409*c*-2 are cemented together.

FIG. 14 is a schematic configuration diagram that shows still another example of the deformable mirror 409 applicable as a variable mirror used in the zoom optical system according to the present invention.

The deformable mirror of this example is designed so that the piezoelectric element 409*c* is sandwiched between the thin film 409*a* and a plurality of electrodes 409*d*, and these are placed on the support 423. A voltage is applied to the piezoelectric element, which is placed between the thin film 409*a* and the electrodes 409*d*, via a driving circuit 425*a* controlled by the arithmetical unit 414. Furthermore, apart from this, voltages are applied to the plurality of electrodes 409*b* also, which are formed on a bottom surface inside the support 423, via driving circuits 425*b* controlled by the arithmetical unit 414. Resultantly, the thin film 409*a* can be doubly deformed by electrostatic forces derived from the voltage applied between the thin film 409*a* and the electrodes 409*d* and from the voltages applied to the electrodes 409*b*. Therefore, this example has a merit that a larger number of deformation patterns are possible and a faster response is achieved than in the case of any examples previously set forth. Other reference numerals in FIG. 14 are the same as those in FIG. 10.

Also, the thin film 409a of the deformable mirror can be deformed into either a convex surface or a concave surface upon the sign of the voltages applied between the thin film 409a and the electrodes 409d being changed. In this case, it may be designed so that piezoelectric effect causes a considerable amount of deformation while electrostatic force causes a fine shape change. Alternatively, it may be designed so that piezoelectric effect is mainly used for deformation of a convex surface while electrostatic force is mainly used for deformation of a concave surface. It is noted that the electrodes 409d may be constructed of a single electrode or a plurality of electrodes like the electrodes 409b. The configuration of the electrodes 409d composed of a plurality of electrodes is illustrated in FIG. 14. In this description, piezoelectric effect, electrostrictive effect, and electrostriction are generally referred to as "piezoelectric effect". Thus, electrostrictive substance also is classified into piezoelectric substance.

Figure 15:
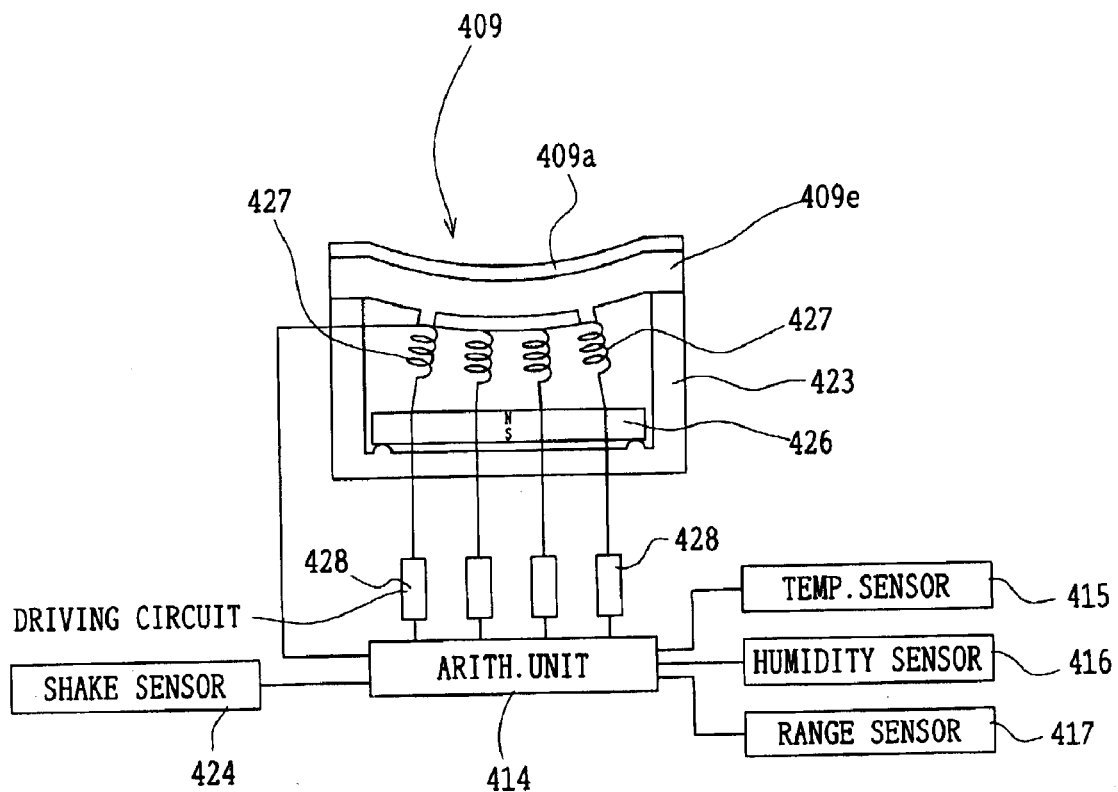
FIG. 15 is a schematic configuration diagram that shows still another example of the deformable mirror 409 applicable as the deformable mirror used in to the zoom optical system according to the present invention.

FIG. 15 is a schematic configuration diagram that shows still another example of the deformable mirror 409 applicable as a deformable mirror used in the zoom optical system according to the present invention.

The deformable mirror of this example is designed to change the shape of the reflecting surface utilizing electromagnetic force. A permanent magnet 426 is fixed on the bottom surface inside of the support 423, and the periphery of the substrate 409e made of silicon nitride, polyimide or the like is mounted and fixed on the top face of the support 423. The surface of the substrate 409e is provided with the thin film 409a made of metal coating such as aluminum, to form the deformable mirror 409.

A plurality of coils 427 are fixedly mounted on the back surface of the substrate 409e, and are connected with the arithmetical unit 414 via the driving circuits 428, respectively. Other reference numerals in FIG. 15 are the same as those in FIG. 10. When appropriate currents are supplied to the individual coils 427 from the individual driving circuits 428 based on output signals from the arithmetical unit 414, which depend on a required change of the optical system determined by the arithmetical unit 414 on the basis of signals from the respective sensors 415, 416, 417, and 424, the coils 427 are repelled or attracted by the electromagnetic force acting with the permanent magnet 426, to deform the substrate 409e and the thin film 409a.

In this case, it can be designed so that different amounts of electric current flow through the respective coils 427. Also, the coils 427 may be provided as a single coil. Alternatively, it may be designed so that the permanent magnet 426 is mounted on the back surface of the substrate 409e and the coils 427 are arranged on the bottom surface inside the support 423. Also, fabricating the coils 427 as thin film coils by lithography process is preferable. In addition, a ferromagnetic iron core may be encased in each coil 427.

Figure 16:
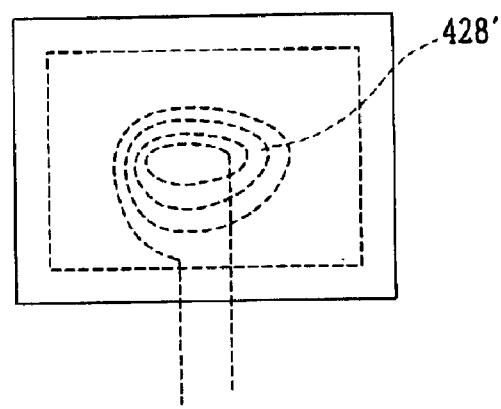
FIG. 16 is an explanatory diagram that shows the winding density of a thin-film coil 427 in the example of FIG. 15.

In the case where thin film coils are used, it can be designed so that coil density of the thin-film coils 427 varies position by position on the back surface of the substrate 409e, as illustrated in FIG. 16 as a coil 428', thereby to give the substrate 409e and the thin film 409a a desirable deformation. Also, the coils 427 may be provided as a single coil, or may encase ferromagnetic iron cores inserted therein.

Figure 17:
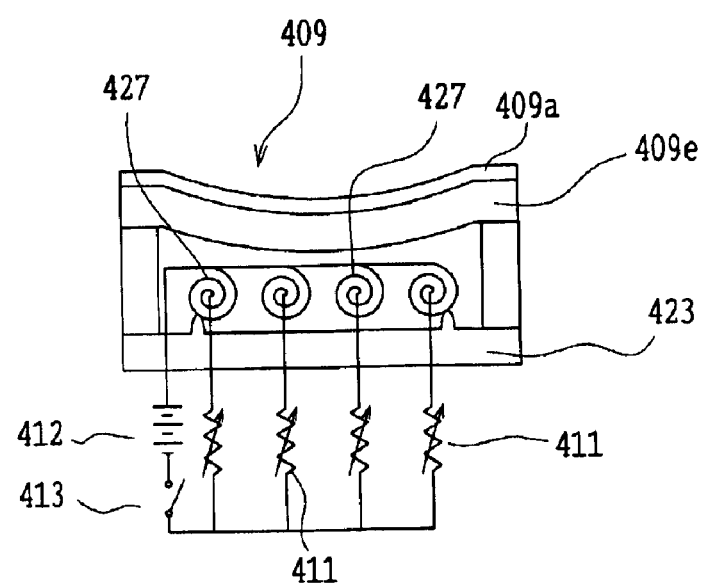
FIG. 17 is a schematic configuration diagram that shows still another example of the deformable mirror 409 applicable as the deformable mirror used in the zoom optical system according to the present invention.

FIG. 17 is a schematic configuration diagram that shows still another example of the deformable mirror 409 applicable as a variable mirror used in the zoom optical system according to the present invention.

According to this example, the substrate 409e is made of a ferromagnetic such as iron and the thin film 409a as a reflecting film is made of aluminum or the like. The periphery of the substrate 409e is mounted and fixed on the top face of the support 423. The coils 427 are fixed on the bottom surface inside the support 423. In this case, since thin-film coils need not be provided on the back surface of the substrate 409e, the structure can be made simple, to reduce manufacture cost. Also, if the power switch 413 is replaced by an alternation and power on-off switch, directions of currents flowing through the coils 427 are changeable, and accordingly the substrate 409e and the thin film 409a are freely deformable.

Figure 18:
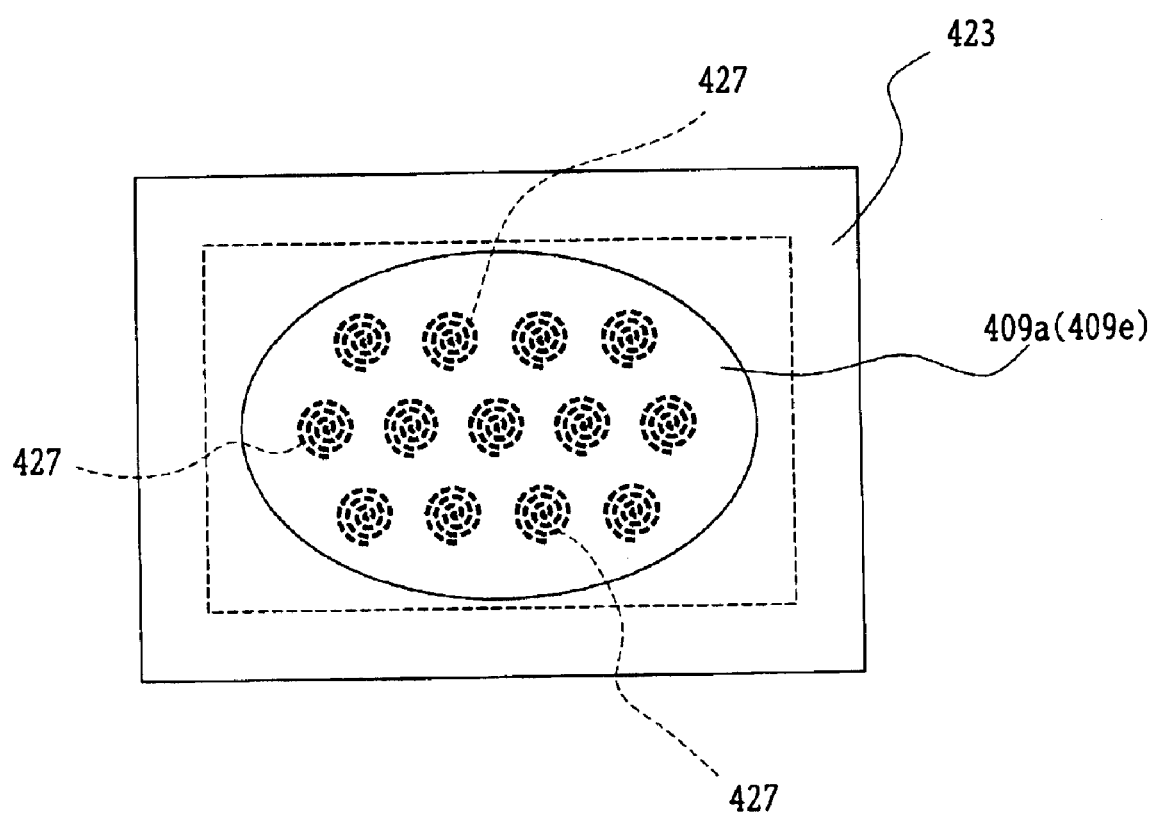
FIG. 18 is an explanatory diagram that shows one arrangement example of the coils 427 in the example of FIG. 17.
Figure 19:
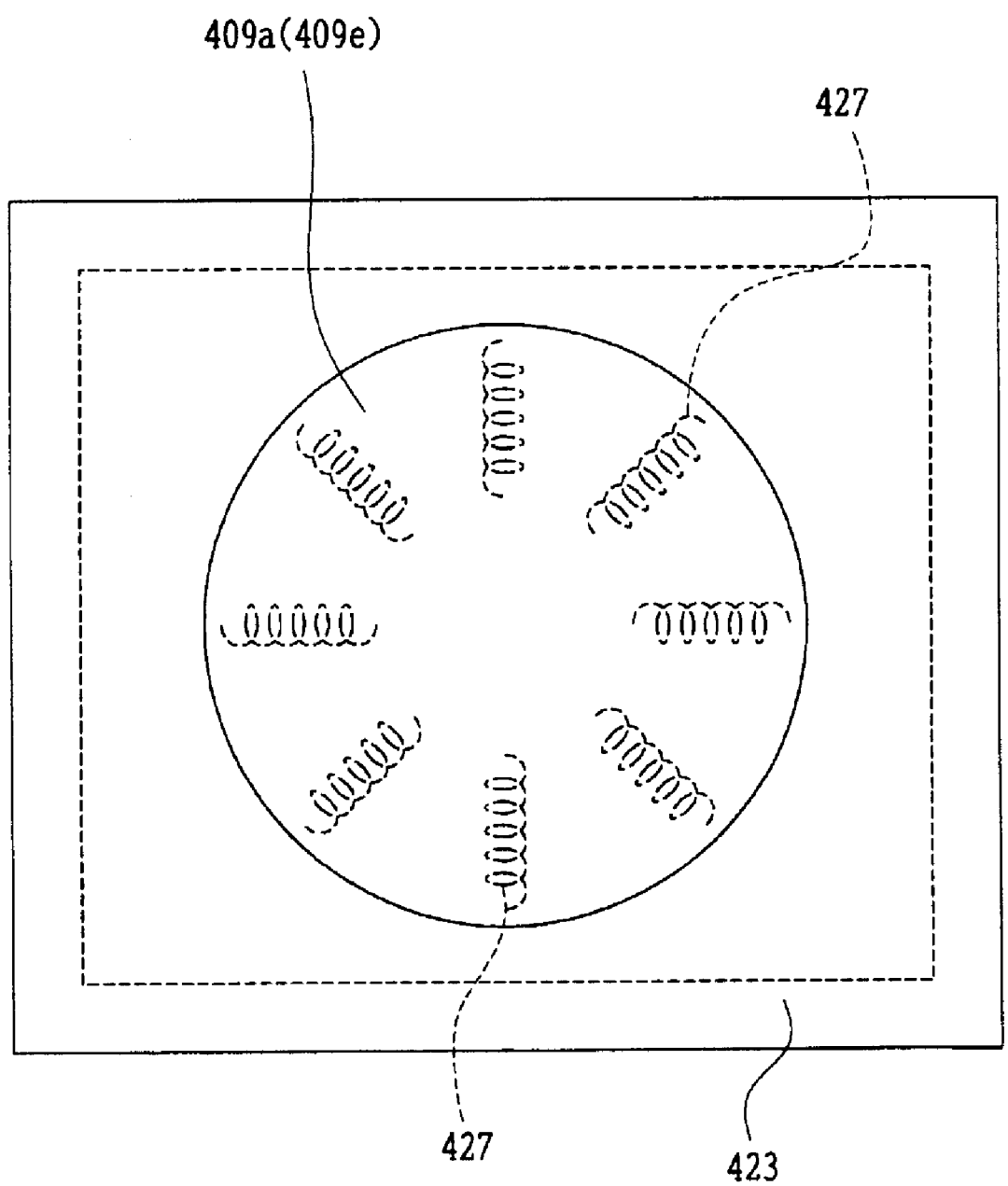
FIG. 19 is an explanatory diagram that shows another arrangement example of the coils 427 in the example of FIG. 17.
Figure 20:
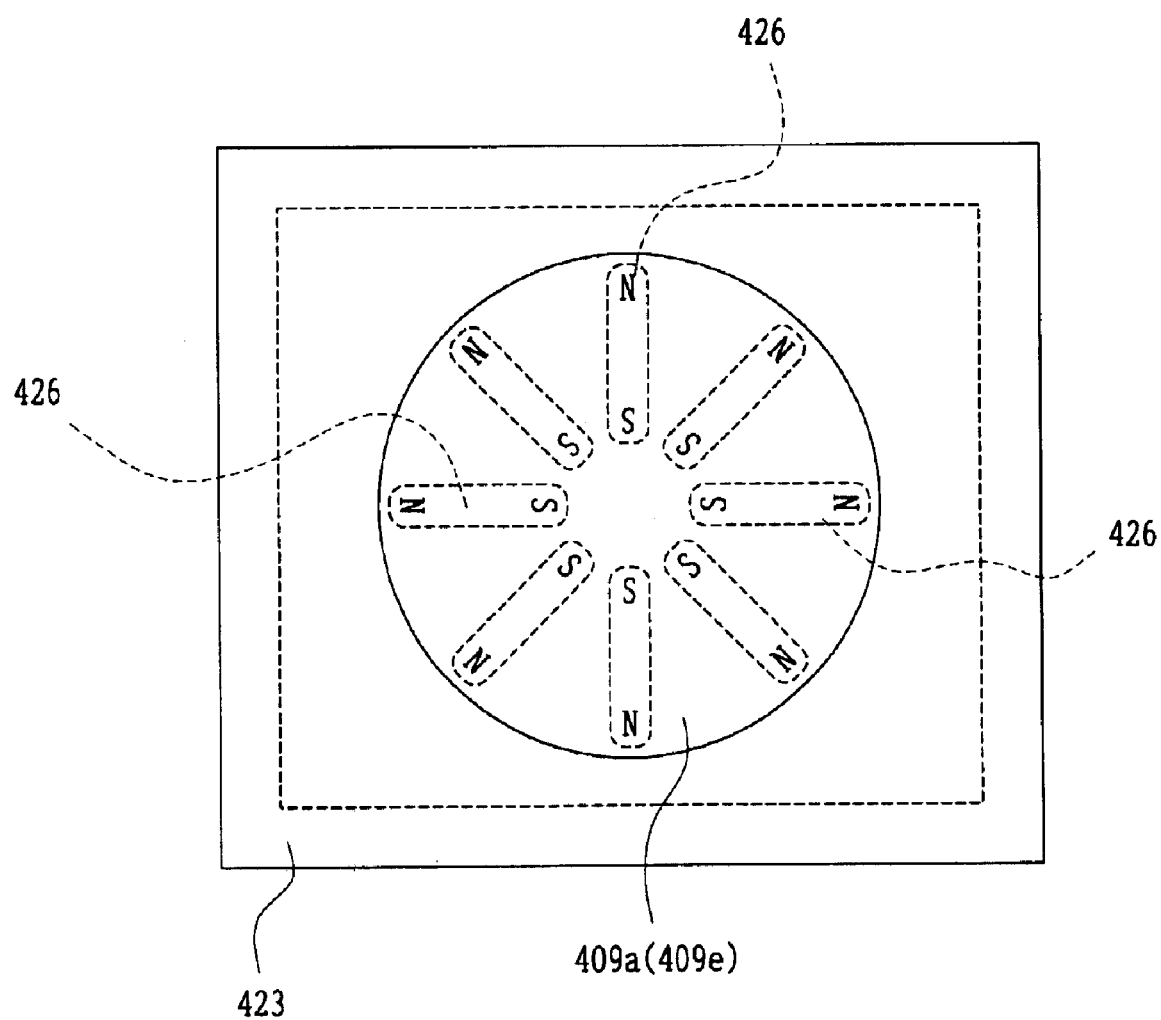
FIG. 20 is an explanatory diagram that shows an arrangement of permanent magnets 426 that is suitable to the case where the coils 427 are arranged as shown in FIG. 19 in the example of FIG. 15.

FIG. 18 shows an arrangement example of the coils 427 arranged in reference to the thin film 409a and the substrate 409e. FIG. 19 shows another arrangement example of the coils 427. These arrangements are applicable to the examples shown in FIG. 15, also. It is noted that FIG. 20 shows an arrangement of permanent magnets 426 that is suitable to the case where the coils 427 are arranged in a radial pattern as shown in FIG. 19. Specifically, the radial arrangement of the bar-shaped permanent magnets 426 as shown in FIG. 20 can give the substrate 409e and the thin film 409a finer deformation than the example shown in FIG. 15. In addition, deforming the substrate 409e and the thin film 409a by electromagnetic force (the examples of FIG. 15 and FIG. 17) has a merit that the substrate and the thin film can be driven at a lower voltage than in the case where electrostatic force is used.

While several examples of the deformable mirror are described above, two or more kinds of forces may be used for deformation of a mirror formed of a thin film as set forth in the example of FIG. 14. Specifically, two or more kinds of forces out of electrostatic force, electromagnetic force, piezoelectric effect, magnetrostriction, pressure of fluid, electric field, magnetic field, temperature change, electromagnetic wave, etc. may be simultaneously used, to deform the deformable mirror. Accordingly, if two or more different driving methods are used to make the variable optical-property optical element, substantial deformation and fine deformation can be simultaneously achieved, to realize a mirror surface with high accuracy.

Figure 21:
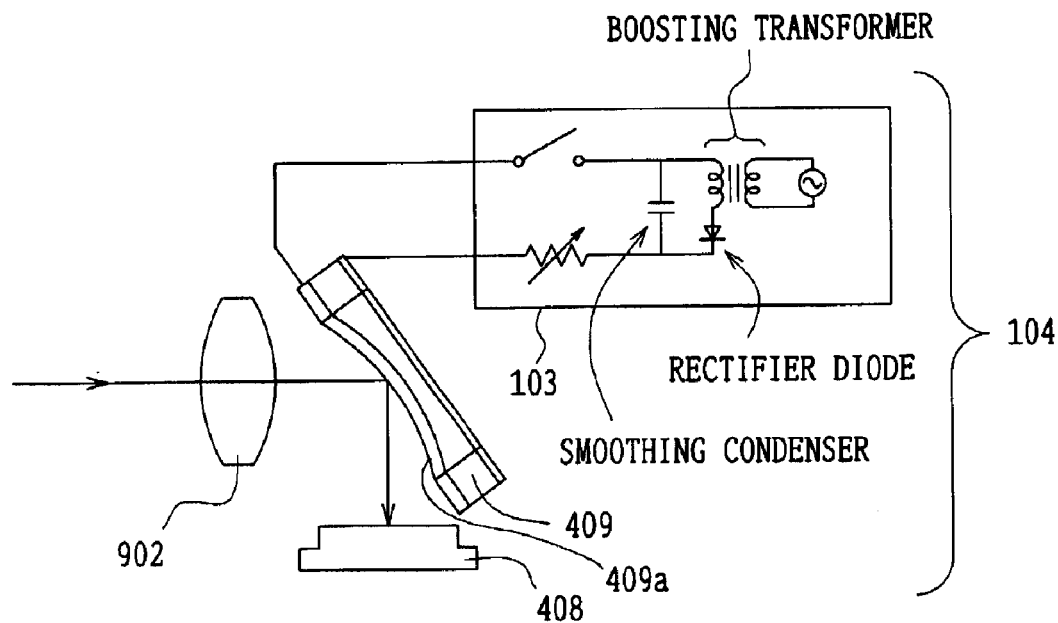
FIG. 21 is a schematic configuration diagram of an imaging system using the deformable mirror 409, as the deformable mirror applicable to the imaging apparatus using the zoom optical system according to the present invention.

FIG. 21 is a schematic configuration diagram of an imaging system, which uses the deformable mirror 409 as a deformable mirror applicable to the imaging apparatus using the zoom optical system according to the present invention, such an imaging system being applied to a digital camera of a cellular phone, a capsule endoscope, an electronic endoscope, a digital camera for a personal computer, and a digital camera for a PDA.

In the imaging optical system of this example, the deformable mirror 409, the lens 902, the solid-state image sensor 408, and a control system 103 form an imaging unit 104, namely one imaging device. In the imaging unit 104 of this example, the configuration is made so that light from an object passing through the lens 902 is reflected at the thin film (reflecting surface) 409a of the deformable mirror 409 to be converged and imaged on the solid-state image sensor 408. The deformable mirror 409 is a kind of variable optical-property optical element, and is referred to as a variable focus mirror also.

According to this example, even when the object distance is changed, the object can be brought into focus by deformation of the reflecting surface 409a of the deformable mirror 409. Therefore, the configuration does not require any motor or the like to move the lenses and thus excels in achieving compact and lightweight design and low power consumption. Also, the imaging unit 104 is applicable, as an imaging optical system according to the present invention, to each of the examples. Also, if a plurality of deformable mirrors 409 are used, an optical system such as a zoom imaging optical system or a variable magnification imaging system can be constructed.

It is noted that FIG. 21 shows a configuration example of the control system 103, which includes a boosting circuit of a transformer using coils. Specifically, use of a laminated piezoelectric transformer would facilitate compact design and thus is favorable. A boosting circuit may be used in any of the deformable mirrors and variable focus lenses of the present invention that use electricity, and, in particular, is useful for a deformable mirror or a variable focus lens that utilizes electrostatic force or piezoelectric effect. In order to use the deformable mirror 409 for focusing, it is only necessary to form an object image on the solid-state image sensor 408, for example, and to detect a state where high-frequency components of the object image are maximized while changing the focal length of the deformable mirror 409. In order to detect high-frequency components, it is only necessary to connect a processor including a microcomputer and so on with the solid-state image sensor 408 and to detect the high-frequency components therein.

Figure 22:
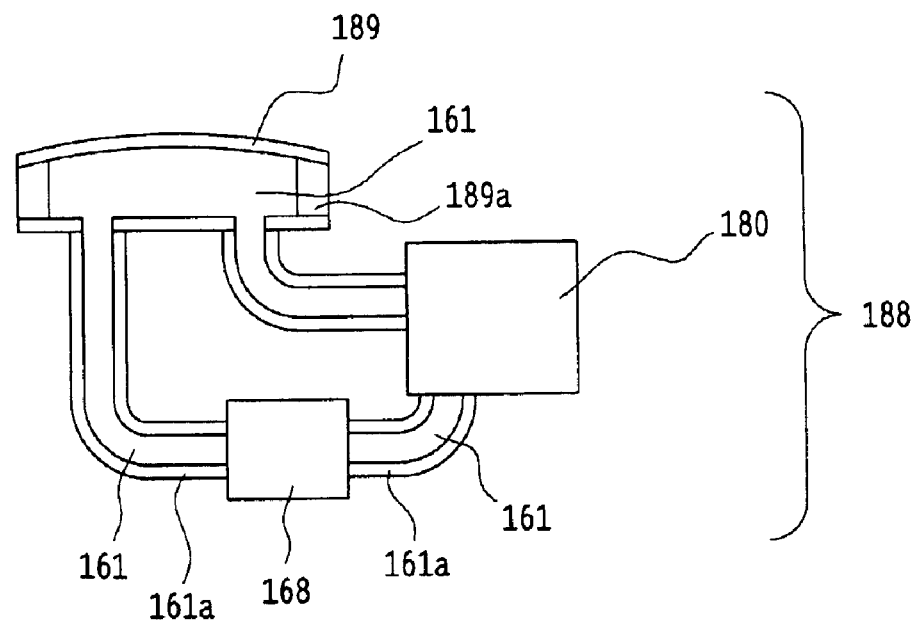
FIG. 22 is a schematic configuration diagram that shows still another example of the deformable mirror 188 applicable as the deformable mirror used in the zoom optical system according to the present invention.

FIG. 22 is a schematic configuration diagram that relates to still another example of the deformable mirror applicable to the zoom optical system according to the present invention. The deformable mirror 188 of FIG. 22 is constructed so that fluid 161 in a pipe 106*a* is taken in and out by a micropump 180 to deform a mirror surface, which is the outside surface of a reflecting film 189 spread across the upper face of a support 189*a*. This example has a merit that the mirror surface can be considerably deformed. Also, a liquid tank 168 is provided between the support 189*a* and the micropump 180, which are connected by the pipe, so that the fluid 161 can be supplied by a preset amount inside the support 189*a*.

The micropump 180 is, for example, a small-sized pump fabricated by micromachining technique and is configured to work using an electric power. As examples of pumps fabricated by the micromachining technique, there are those which use thermal deformation, piezoelectric substance, electrostatic force, etc.

Figure 23:
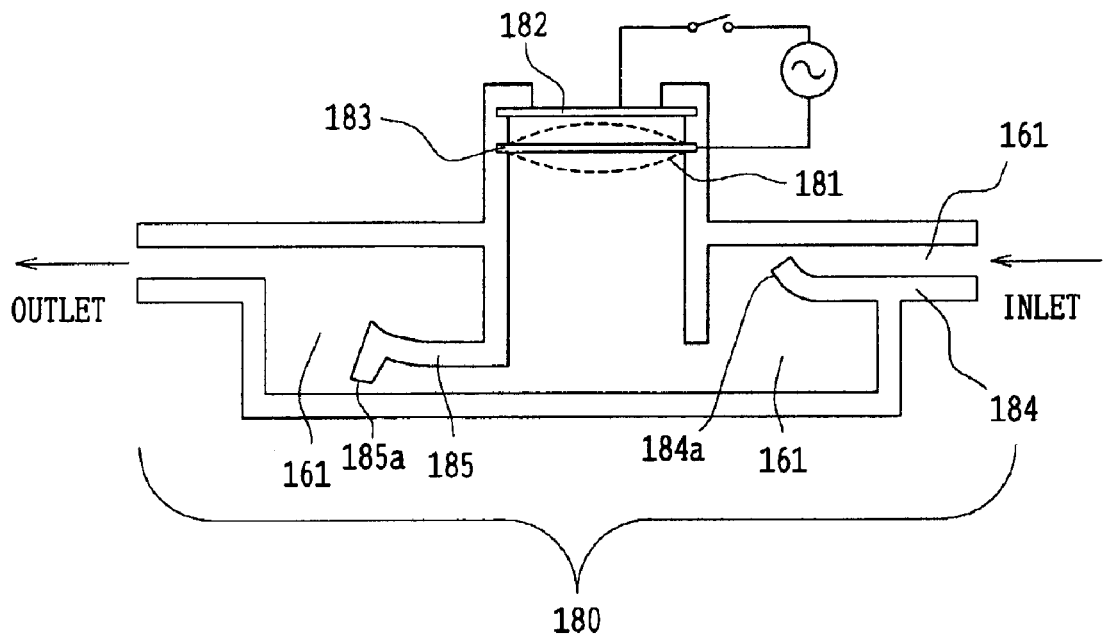
FIG. 23 is a schematic configuration diagram that shows one example of the micropump applicable to the deformable mirror used in the zoom optical system according to the present invention.

FIG. 23 is a schematic configuration diagram that shows one example of the micropump. In the micropump 180, a vibrating plate 181 is vibrated by an electric force such as electrostatic force, piezoelectric effect or the like. FIG. 23 shows an example where vibration is caused by the electrostatic force. In FIG. 23, the reference numerals 182 and 183 denote electrodes. Also, the dash lines indicate the vibrating plate 181 as deformed. As the vibrating plate 181 vibrates, tips 184*a* and 185*a* of two valve 184 and 185 are opened and closed, to feed the fluid 161 from the right to the left.

In the deformable mirror 188 shown in FIG. 22, the surface of the reflecting film 189 functions as a deformable mirror upon the reflecting film 189 being deformed into a concave or convex shape in accordance with an amount of the fluid 161. That is, the deformable mirror 188 is driven by the fluid 161. Organic or inorganic substance, such as silicon oil, air, water, and jelly, can be used as the fluid.

Also, a deformable mirror, a variable focus lens or the like using electrostatic force or piezoelectric effect sometimes requires a high voltage for driving it. In this case, as shown in FIG. 21, for example, a boosting transformer or a piezoelectric transformer is preferably used to configure the control system.

Also, if the thin film 409*a* or the reflecting film 189 for reflection is provided with a non-deformable portion to be fixed to the support 423 or the support 189*a*, this portion can be conveniently used as a reference surface for measuring the shape of the deformable mirror with an interferometer or the like.

Figure 24:
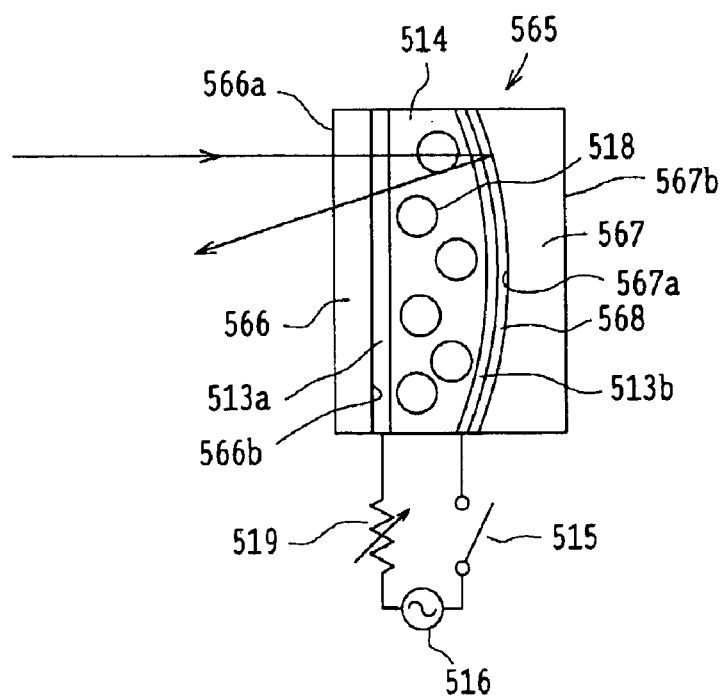
FIG. 24 is a diagram that shows a variable focus mirror, to which the variable focus lens is applied, applicable to the zoom optical system according to the present invention.

FIG. 24 shows an example where a variable focus lens is used as the variable focus mirror in the zoom optical system according to the present invention. The variable focus mirror 565 includes a first transparent substrate 566 having first and second surfaces 566*a* and 566*b*, and a second transparent substrate 567 having third and fourth surfaces 567*a* and 567*b*. The first transparent substrate 566 is configured to have a flat plate shape or a lens shape and to be provided with a transparent electrode 513*a* on the inner surface (the second surface) 566*b* thereof. The second transparent substrate 567 is configured so that the inner surface (the third surface) 567*a* thereof is shaped as a concave surface, which is coated with a reflecting film 568, on which a transparent electrode 513*b* is further provided. A macromolecular dispersed liquid crystal layer 514 is sandwiched between the transparent electrodes 513*a* and 513*b* so that an alternating-current voltage is applied thereto as the transparent electrodes 513*a* and 513*b* are connected with an alternating-current power supply 516 via a switch 515 and a variable resistor 519. In FIG. 24, illustration of liquid crystal molecules is omitted.

In this configuration, since a ray of light incident on the mirror from the side of the transparent substrate 566 forms a path reciprocated in the macromolecular dispersed liquid crystal layer 514 by the reflecting film (reflecting surface) 568, the macromolecular dispersed liquid crystal layer 514 exerts its function twice. Also, by changing the voltage applied to the macromolecular dispersed liquid crystal layer 514, it is possible to shift the focal position for reflected light. In this case, since a ray of light incident on the variable focus mirror 565 is transmitted through the macromolecular dispersed liquid crystal layer 514 twice, when twice the thickness of the macromolecular dispersed liquid crystal layer 514 is represented by t, the numerical conditions set forth above are applicable in the similar manner. Also, the inner surface of the transparent substrate 566 or 567 can be configured as a diffraction grating, to reduce the thickness of the macromolecular dispersed liquid crystal layer 514. This solution is favorable in reducing scattered light.

In the description set forth above, the alternating-current power supply 516 is used as a power source to apply an alternating-current voltage to the liquid crystal layer for the purpose of preventing deterioration of the liquid crystal. However, a direct-current power supply may be used to apply a direct-current voltage to the liquid crystal. Change of orientation of the liquid crystal molecules may be achieved by, not limited to the technique of changing the voltage, a technique of changing frequency of an electric field applied to the liquid crystal layer, intensity and frequency of a magnetic field applied to the liquid crystal layer, or temperature or the like of the liquid crystal layer. Some kind of macromolecular dispersed liquid crystal is nearly a solid rather than a liquid. In such a case, therefore, one of the transparent substrates 566 and 567 shown in FIG. 24 is dispensable.

The optical element of the type as set forth in reference to FIG. 24, the focal length of which is changed by altering the refracting index of a medium that forms a macromolecular dispersed liquid crystal layer, has merits such that it facilitates mechanical design, has a simple mechanical structure and so on because of its unchanged shape.

In the present invention, a variable focus mirror that is non-deformable as shown in FIG. 24 also is classified into the deformable mirror.

Figure 25:
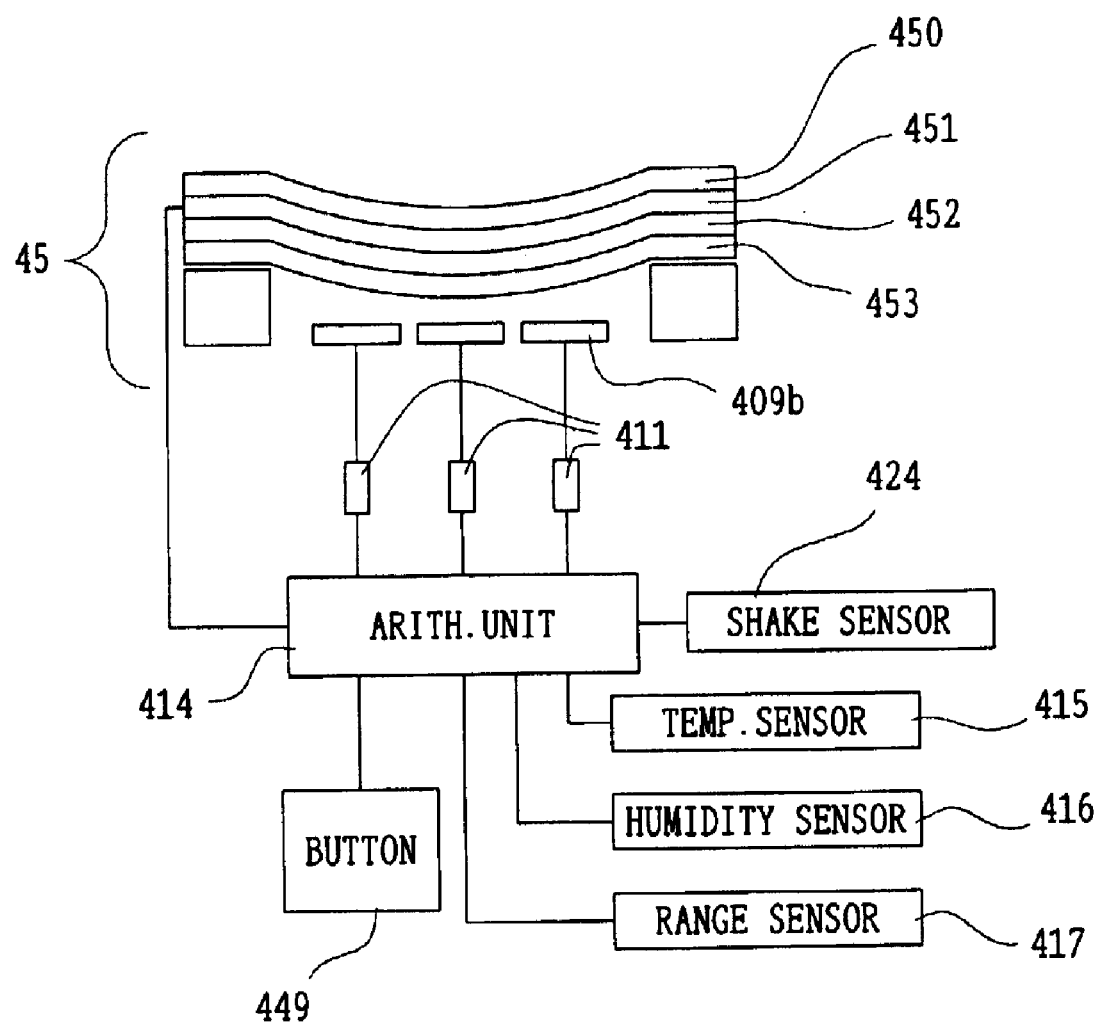
FIG. 25 is a schematic configuration diagram that shows still another example of the deformable mirror applicable to the deformable mirror used in the zoom optical system according to the present invention.

FIG. 25 is a schematic configuration diagram that shows still another example of the deformable mirror applicable as a deformable mirror used in the zoom optical system according to the present invention. In this example, explanation is made on the basis of the supposition that the deformable mirror is applied to a digital camera. In FIG. 25, the reference numeral 411 denotes a variable resistor, the reference numeral 414 denotes an arithmetical unit, the reference numeral 415 denotes a temperature sensor, the reference numeral 416 denotes a humidity sensor, the reference numeral 417 denotes a range sensor, and the reference numeral 424 denotes a shake sensor.

The deformable mirror 45 of this example is configured to provide a plurality of segmented electrodes 409*b* disposed spaced away from an electrostrictive substance 453 made of an organic substance such as acrylic elastomer, to provide an electrode 452 and a deformable substrate 451 arranged in this order on the electrostrictive substance 453, and to provide a reflecting film 450 made of metal such as aluminum further on the substrate 451. In this way, the deformable layer of the deformable mirror 45 has a four-layer structure.

This configuration has a merit that the surface of the reflecting film (reflecting surface) 450 is made smoother than in the case where the segmented electrodes 409b and the electrostrictive substance 453 are integrally constructed and thus aberrations are hard to generate optically. It is noted that the arrangement order of the deformable substrate 451 and the electrodes 452 may be reversed.

In FIG. 25, the reference numeral 449 denotes a button for performing magnification change or zooming of the optical system. The deformable mirror 45 is controlled via the arithmetical unit 414 so that a user can change the shape of the reflecting film 450 for magnification change or zooming by pushing the button 449.

It is noted that a piezoelectric substance such as barium titanate set forth above may be used instead of the electrostrictive substance made of an organic substance such as acrylic elastomer.

As is commonly applicable to the various deformable mirrors described above, it is desirable that the contour of the deformable portion of the reflecting surface as viewed from a direction perpendicular to the reflecting surface is oblong in the direction of the plane of incidence of an axial ray, for example, elliptical, oval, or polygonal. The reason is as follows. The deformable mirror, as in the example of FIG. 9, is often used in a state where a ray of light is incident at a grazing angle. In order to suppress aberrations generated in this case, it is desirable that the reflecting surface has a shape similar to ellipsoid of revolution, paraboloid of revolution, or hyperboloid of revolution. If the contour of the deformable portion of the reflecting surface as viewed from the direction perpendicular to the reflecting surface is shaped oblong in the direction of the plane of incidence of an axial ray, the reflecting surface of the deformable mirror can be easily deformed into a shape similar to ellipsoid of revolution, paraboloid of revolution, or hyperboloid of revolution, which is advantageous for compensation for aberrations.

Finally, definitions of terms used in the present invention will be described.

The optical apparatus signifies an apparatus including an optical system or optical elements. It is not necessary that the optical apparatus can function by itself, that is, the optical apparatus may be a part of an apparatus. An imaging apparatus, an observation apparatus, a display apparatus, an illumination apparatus, a signal processing apparatus, etc. are classified into the optical apparatus.

As examples of the imaging apparatus, there are a film camera, a digital camera, robot eyes, a lens-exchange-type digital single-lens reflex camera, a TV camera, a motion-picture recording apparatus, an electronic motion-picture recording apparatus, a camcorder, a VTR camera, an electronic endoscope, etc. The digital camera, a card-type digital camera, the TV camera, the VTR camera, the motion-picture recording camera, etc. are examples of the electronic imaging apparatus.

As examples of the observation apparatus, there are a microscope, a telescope, spectacles, binoculars, a magnifying glass, a fiberscope, a finder, a viewfinder, etc.

As examples of the display apparatus, there are a liquid crystal display, a viewfinder, a game machine (PlayStation by SONY), a video projector, a liquid crystal projector, a head mounted display (HMD), a personal data assistant (PDA), a cellular phone, etc.

As examples of the illumination apparatus, there are a strobe for a camera, a headlight of an automobile, a light source for an endoscope, a light source for a microscope, etc.

As examples of the signal processing apparatus, there are a cellular phone, a personal computer, a game machine, a read/write apparatus for optical-discs, an arithmetical unit in an optical computer, etc.

The zoom optical system according to the present invention is small and lightweight, and thus is effectively used as an imaging system in an electronic imaging apparatus or in a signal processing apparatus, in particular, in a digital camera or a cellular phone.

The image pickup element signifies, for example, a CCD, a pickup tube, a solid-state image sensor, a photographic film, etc. A plane parallel plate is classified into the prism. Change of the observer includes the case where the diopter is changed. Change of the object includes the cases where the object distance is changed, where the object is displaced, where the object is moved, vibrated, or shaken, etc.

The expanded curved surface is defined as follows.

Not limited to a spherical, planar or rotationally symmetric aspherical surface, a surface may be configured as a spherical, planar or rotationally symmetric aspherical surface that is decentered from the optical axis; an aspherical surface defining planes of symmetry, only one plane of symmetry or no plane of symmetry; a free-formed surface; a surface having an indifferentiable point or line, or the like. In addition, irrespective of whether it is a reflecting surface or a refracting surface, any surface is applicable as long as it can exert some effect on light. According to the present invention, these surfaces are generally referred to as expanded curved surfaces.

A variable focus lens, a deformable mirror, a polarizing prism having a variable surface shape, a variable apex-angle prism, a variable diffraction optical element having a variable light-deflecting function, that is, a variable HOE or a variable DOE, etc. are classified into the variable optical-property optical element. A variable lens that changes not the focal length but the amount of aberrations is classified into the variable focus lens, also. Regarding the deformable mirror also, similar classification is applied. To conclude, an optical element that is changeable in light deflecting function such as reflection, refraction and diffraction is referred to as a variable optical-property optical element.

The data transmitter signifies an apparatus that allows data to be input therein and transmits the data, including a cellular phone; a fixed phone; a game machine; a remote controller of a TV set, a radio cassette recorder or a stereo set; a personal computer; and a keyboard, a mouse, a touchpanel, etc. of a computer. A TV monitor provided with an imaging device, and a monitor and a display of a personal computer also are classified into the data transmitter. Also, the data transmitter is classified into the signal processing apparatus.

What is claimed is:

1. A zoom optical system comprising:
    at least two optical-element groups; and
    a variable optical-property optical element,
    wherein the two optical-element groups are movable in a magnification change and have a magnification varying function or a compensating function for compensating for a shift of an image surface caused by the magnification change,
    wherein the variable optical-property optical element has a focusing function and is disposed on an image side of the optical-element groups, and
    wherein the zoom optical sytem comprises an optical-element group that is disposed on a imagemost side, the variable optical-property optical element being arranged in the optical-element group that is disposed on the imagemost side.

2. A zoom optical system according to claim 1, wherein the variable optical-property optical element has a rotationally asymmetric curved surface that has a function for compensating for decentered aberrations.

3. A zoom optical system according to claim 1, wherein the following condition is satisfied:

$$70°\leq\Phi\leq110°$$

where $\Phi$ is an angle of turning of an optical axis caused by the variable optical-property optical element.

4. A zoom optical system according to claim 1, wherein the variable optical-property optical element is driven by one of an electrostatic force, an electromagnetic force, a piezoelectric effect, and fluid.

5. A zoom optical system comprising:
   at least two optical-element groups; and
   a variable optical-property optical element,
   wherein the two optical-element groups are movable in a magnification change and have a magnification varying function or a compensating function for compensating for a shift of an image surface caused by the magnification change,
   wherein the variable optical-property optical element has a focusing function and is disposed on an image side of the optical-element groups, and
   wherein the following conditions are satisfied:

$$0.5 < EX_W/f_W < 50.0$$
$$0.5 < EX_T/f_T < 50.0$$

where $EX_W$ is a physical distance from an exit pupil position of an optical system as viewed from the variable optical-property optical element to the variable optical-property optical element at a wide-angle end, $EX_T$ is a physical distance from an exit pupil position of the optical system as viewed from the variable optical-property optical element to the variable optical-property optical element at a telephoto end, $f_W$ is a focal length of the entire optical system at the wide-angle end, and $f_T$ is a focal length of the entire optical system at the telephoto end.

6. A zoom optical system comprising:
   at least two optical-element groups; and
   a variable optical-property optical element,
   wherein the two optical-element groups are movable in a magnification change and have a magnification varying function or a compensating function for compensating for a shift of an image surface caused by the magnification change,
   wherein the variable optical-property optical element has a focusing function and is disposed on an image side of the optical-element groups, and
   wherein the following condition is satisfied:

$$0.3 < \xi_w < 0.9$$

where $\xi_w$ is a magnification of a group of optical elements arranged between the variable optical-property optical element and an image surface.

7. A zoom optical system comprising:
   at least two optical-element groups; and
   a variable optical-property optical element,
   wherein the two optical-element groups are movable in a magnification change and have a magnification varying function or a compensating function for compensating for a shift of an image surface caused by the magnification change,
   wherein the variable optical-property optical element has a focusing function and is disposed on an image side of the optical-element groups, and
   wherein the following condition is satisfied:

$$-5.0 < (f_a/f_b) \times f_W < -0.5$$

where $f_a$ is a focal length, at a wide-angle end, of a group of optical elements arranged on an object side of an aperture stop, $f_b$ is a focal length, at the wide-angle end, of a group of optical elements arranged on an image side of the aperture stop, and $f_W$ is a focal length of the entire system at the wide-angle end.

8. A zoom optical system comprising:
   at least two optical-element groups; and
   a variable optical-property optical element,
   wherein the two optical-element groups are movable in a magnification change and have a magnification varying function or a compensating function for compensating for a shift of an image surface caused by the magnification change,
   wherein the variable optical-property optical element has a focusing function and is disposed on an image side of the optical-element groups, and
   wherein the following condition is satisfied:

$$D < 20.0 \text{ mm}$$

where D is an effective diameter of the variable optical-property optical element.

9. A zoom optical system comprising:
   at least two optical-element groups; and
   a variable optical-property optical element,
   wherein the two optical-element groups are movable in a magnification change and have a magnification varying function or a compensating function for compensating for a shift of an image surface caused by the magnification change,
   wherein the variable optical-property optical element has a focusing function and is disposed on an image side of the optical-element groups,
   wherein the zoom optical sytem comprises, in order from an object side:
   a first optical-element group having a negative optical power;
   a second optical-element group having a positive optical power,
   a third optical-element group having a positive optical power; and
   a fourth optical-element group having a positive optical power, and
   wherein the two optical-element groups movable in the magnification change are the second optical-element group and the third optical-element group.

10. A zoom optical system comprising:
    at least two optical-element groups; and
    a variable optical-property optical element,
    wherein the two optical-element groups are movable in a magnification change and have a magnification varying function or a compensating function for compensating for a shift of an image surface caused by the magnification change,
    wherein the variable optical-property optical element has a focusing function and is disposed on an image side of the optical-element groups,
    wherein the zoom optical sytem comprises, in order from an object side:

a first optical-element group having a negative optical power;

a second optical-element group having a positive optical power; and a third optical-element group having a positive optical power, and wherein at least the second optical-element group has the magnification varying function.

11. A zoom optical system comprising:

at least two optical-element groups; and a variable optical-property optical element, wherein the two optical-element groups are movable in a magnification change and have a magnification varying function or a compensating function for compensating for a shift of an image surface caused by the magnification change, wherein the variable optical-property optical element has a focusing function and is disposed on an image side of the optical-element groups, wherein the zoom optical system comprises, in order from an object side:

a first optical-element group having a negative optical power;

a second optical-element group having a positive optical power;

a third optical-element group having a positive optical power; and a fourth optical-element group having a positive optical power, and wherein at least the second optical-element group has the magnification varying function.

12. An imaging apparatus comprising a zoom optical system, the zoom optical system comprising:

at least two optical-element groups; and a variable optical-property optical element, wherein the two optical-element groups are movable in a magnification change and have a magnification varying function or a compensating function for compensating for a shift of an image surface caused by the magnification change, wherein the variable optical-property optical element has a focusing function and is disposed on an image side of the optical-element groups, and wherein the zoom optical system comprises an optical-element group that is disposed on a imagemost side, the variable optical-property optical element being arranged in the optical-element group that is disposed on the imagemost side.

* * * * *

UNITED STATES PATENT AND TRADEMARK OFFICE
CERTIFICATE OF CORRECTION

PATENT NO. : 6,906,867 B2
DATED : June 14, 2005
INVENTOR(S) : S. Mihara

It is certified that error appears in the above-identified patent and that said Letters Patent is hereby corrected as shown below:

Column 34,
Line 59, change "sytem" to -- system --.

Column 36,
Lines 40 and 66, change "sytem" to -- system --.

Signed and Sealed this

Fourteenth Day of February, 2006

JON W. DUDAS
*Director of the United States Patent and Trademark Office*